(12) United States Patent
Lu et al.

(10) Patent No.: US 11,397,690 B2
(45) Date of Patent: Jul. 26, 2022

(54) VIRTUALIZED CACHE IMPLEMENTATION METHOD AND PHYSICAL MACHINE

(71) Applicant: Huawei Technologies Co., Ltd., Shenzhen (CN)

(72) Inventors: Lina Lu, Hangzhou (CN); Xian Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 17/115,273

(22) Filed: Dec. 8, 2020

(65) Prior Publication Data

US 2021/0089471 A1    Mar. 25, 2021

Related U.S. Application Data

(63) Continuation of application No. PCT/CN2019/080074, filed on Mar. 28, 2019.

(30) Foreign Application Priority Data

Jun. 12, 2018 (CN) .......................... 201810603891.8

(51) Int. Cl.
  *G06F 12/00*  (2006.01)
  *G06F 12/1045*  (2016.01)
  (Continued)

(52) U.S. Cl.
  CPC .......... *G06F 12/1063* (2013.01); *G06F 3/061* (2013.01); *G06F 3/067* (2013.01);
  (Continued)

(58) Field of Classification Search
  CPC .... G06F 12/1063; G06F 3/061; G06F 3/0664; G06F 3/067; G06F 9/45558;
  (Continued)

(56) References Cited

U.S. PATENT DOCUMENTS

2011/0296407 A1    12/2011  Bhandari et al.
2013/0124791 A1     5/2013  Flynn et al.
                    (Continued)

FOREIGN PATENT DOCUMENTS

CN    101763226 A    6/2010
CN    101968746 A    2/2011
                    (Continued)

OTHER PUBLICATIONS

Kim<,H., et al, "XHive: Efficient Cooperative Caching for Virtual Machines," IEEE Transactions on Computers, vol. 60, No. 1, Jan. 2011, 14 pages.

(Continued)

*Primary Examiner* — Gurtej Bansal

(74) *Attorney, Agent, or Firm* — Conley Rose, P.C.

(57) ABSTRACT

A virtualized cache implementation solution, where a memory of a virtual machine stores cache metadata. The cache metadata includes a one-to-one mapping relationship between virtual addresses and first physical addresses. After an operation request that is delivered by the virtual machine and that includes a first virtual address is obtained, when the cache metadata includes a target first physical address corresponding to the first virtual address, a target second physical address corresponding to the target first physical address is searched for based on preconfigured correspondences between the first physical addresses and second physical addresses, and data is read or written from or to a location indicated by the target second physical address.

20 Claims, 8 Drawing Sheets

(51) Int. Cl.
*G06F 9/455* (2018.01)
*G06F 12/02* (2006.01)
*G06F 12/06* (2006.01)
*G06F 12/0873* (2016.01)
*G06F 3/06* (2006.01)
*G06F 12/0842* (2016.01)
*G06F 12/0868* (2016.01)
*G06F 12/084* (2016.01)

(52) U.S. Cl.
CPC ........ *G06F 3/0664* (2013.01); *G06F 9/45558* (2013.01); *G06F 12/0238* (2013.01); *G06F 12/0646* (2013.01); *G06F 12/0842* (2013.01); *G06F 12/0868* (2013.01); *G06F 12/0873* (2013.01); *G06F 12/084* (2013.01); *G06F 2009/45579* (2013.01); *G06F 2009/45583* (2013.01); *G06F 2009/45595* (2013.01); *G06F 2212/1024* (2013.01); *G06F 2212/151* (2013.01); *G06F 2212/311* (2013.01); *G06F 2212/7201* (2013.01)

(58) Field of Classification Search
CPC ............ G06F 12/0238; G06F 12/0646; G06F 12/0842; G06F 12/0868; G06F 12/0873; G06F 12/084; G06F 2009/45579; G06F 2009/45583; G06F 2009/45595; G06F 2212/1024; G06F 2212/151; G06F 2212/311; G06F 2212/7201
See application file for complete search history.

(56) References Cited

U.S. PATENT DOCUMENTS

| | | |
|---|---|---|
| 2013/0238855 A1* | 9/2013 | Satran ................ G06F 12/0871 711/E12.017 |
| 2014/0019973 A1 | 1/2014 | Yang et al. |
| 2014/0123145 A1 | 5/2014 | Barrow-Williams et al. |
| 2014/0281131 A1 | 9/2014 | Joshi et al. |
| 2017/0031593 A1 | 2/2017 | Tsirkin et al. |

FOREIGN PATENT DOCUMENTS

| | | |
|---|---|---|
| CN | 102346684 A | 2/2012 |
| CN | 102591702 A | 7/2012 |
| CN | 103150122 A | 6/2013 |
| CN | 103593147 A | 2/2014 |
| CN | 103777926 A | 5/2014 |
| CN | 103902348 A | 7/2014 |
| CN | 104765574 A | 7/2015 |

OTHER PUBLICATIONS

Kourai, K. "Fast and Correct Performance Recovery of Operating Systems Using a Virtual Machine Monitor, VEE" 11, Mar. 9-11, 2011, Newport Beach, California, USA, total 11 pages.

* cited by examiner

VIRTUALIZED CACHE IMPLEMENTATION METHOD AND PHYSICAL MACHINE

CROSS-REFERENCE TO RELATED APPLICATIONS

This application is a continuation of International Patent Application No. PCT/CN2019/080074 filed on Mar. 28, 2019, which claims priority to Chinese Patent Application No. 201810603891.8 filed on Jun. 12, 2018. The disclosures of the aforementioned applications are hereby incorporated by reference in their entireties.

TECHNICAL FIELD

Embodiments of this application relate to the field of virtualization technologies, and in particular, to a virtualized cache implementation method and a physical machine.

BACKGROUND

A virtualization technology uses software to redefine division of information technology (IT) resources and virtualizes one physical machine into a plurality of virtual machines with different hardware. Each virtual machine can run a different operating system, and the virtual machines are independent of each other. Therefore, in a virtualization environment, many applications originally running on a physical machine are migrated to a virtual machine, to implement dynamic allocation and flexible scheduling of IT resources, improve IT resource utilization, and reduce IT costs.

A cache technology is a solution in which hot data stored in a low-speed hardware medium is stored in a high-speed medium to improve data access performance. As applications are migrated to the virtualization environment, cache, as a common storage performance optimization technology, is also migrated to the virtualization environment.

In a virtualized cache solution, referring to FIG. 1, a memory or a high-performance storage medium of a physical machine provides a cache service for a virtual machine running on the physical machine. Alternatively, a cache service is provided, on a storage server connected to a physical machine, for example, a storage area network (SAN) device, for a virtual machine running on the physical machine. When the virtual machine delivers an input/output (I/O) operation request (or referred to as a write/read request), the virtual machine switches from a non-root mode to a root mode, the I/O operation request is delivered to the physical machine or the storage server, and the virtual machine accesses a cache in the physical machine or the storage server. After the cache access is completed, the virtual machine needs to switch from the root mode back to the non-root mode. To be specific, when the virtual machine accesses the cache, there are virtualization switching overheads.

In other approaches, virtualization switching overheads (usually 40-60 microseconds (μs)) in a cache access process cause a relatively long cache access delay and affect cache performance.

SUMMARY

Embodiments of this application provide a virtualized cache implementation method and a physical machine, to reduce a virtualized cache access delay and improve cache performance.

To achieve the foregoing objective, the following technical solutions are used in the embodiments of this application.

According to a first aspect, an embodiment of this application provides a virtualized cache implementation method, applied to a physical machine. A virtual machine runs on the physical machine, and the physical machine stores cache metadata. The cache metadata includes a one-to-one mapping relationship between a plurality of virtual addresses and a plurality of first physical addresses. The virtual address is used to indicate a location in a virtual disk, and the first physical address is a physical address of a cache in the virtual machine. The method includes obtaining an operation request delivered by the virtual machine, where the operation request includes a first virtual address, and is used to request to read or write data from or to a location that is in the virtual disk and that is indicated by the first virtual address, if the cache metadata includes a target first physical address corresponding to the first virtual address, determining, based on preconfigured mapping relationships between the plurality of first physical addresses and a plurality of second physical addresses, a target second physical address corresponding to the target first physical address, where the second physical address is a physical address of a physical disk in the physical machine, reading or writing the data from or to a location that is in the physical disk of the physical machine and that is indicated by the target second physical address.

In this solution, data in the cache of the virtual machine can be accessed without switching between a non-root mode and a root mode. This can save a period of time occupied by virtualization overheads and improve a cache access rate and cache access performance.

In a possible implementation, reading or writing the to-be-operated data from or to the location that is in the cache of the virtual machine and that is indicated by the target second physical address further includes reading or writing, in a non-root mode, the to-be-operated data from or to the location that is in the cache of the virtual machine and that is indicated by the target second physical address, that is, accessing the data in the cache of the virtual machine in the non-root mode.

In another possible implementation, the physical disk is a byte-based addressing storage medium.

In another possible implementation, a memory of the virtual machine stores the cache metadata.

In this solution, the cache metadata stored in the virtual machine can be accessed without virtualization overheads.

In another possible implementation, if the cache metadata does not include the target first physical address corresponding to the first virtual address, the data is written into the cache of the virtual machine, where a location of the data in the cache of the virtual machine is represented as the target first physical address. In addition, the target second physical address corresponding to the target first physical address is determined based on the preconfigured mapping relationships between the plurality of first physical addresses and the plurality of second physical addresses, and a mapping relationship between the target first physical address and the first virtual address is stored into the cache metadata.

That is, if the cache metadata does not include the target first physical address corresponding to the first virtual address, it may be determined that the cache of the virtual machine is missed, and the data to be read or written as requested by the operation request is not in the cache of the virtual machine. In this case, the data needs to be written into the cache of the virtual machine such that the data can be directly read from the cache of the virtual machine next time.

In another possible implementation, first data is determined based on a quality of service (QoS) parameter of the virtual machine or a QoS parameter of the virtual disk in the virtual machine. The QoS parameter includes at least one of a reserved value of the cache, an upper limit of the cache, or a priority of the cache. The management includes cache allocation, cache flushing, cache eviction, cache size modification, cache property modification, cache reuse, and the like.

In this solution, unified management of caches in virtual machines ensures more flexible cache management and reduces management costs. In addition, the caches may be managed based on QoS parameters of different virtual machines, to provide a better cache service for the virtual machines.

In another possible implementation, the method further includes allocating a part of physical addresses in the physical disk to the cache of the virtual machine, and establishing the mapping relationships between the plurality of first physical addresses and the plurality of second physical addresses.

In another possible implementation, N virtual machines run on the physical machine, where N is a positive integer. The method further includes determining, by the physical machine, the first data from caches of the N virtual machines, deleting the first data from the caches of the N virtual machines, and deleting a mapping relationship, in the cache metadata, between a first physical address and a virtual address corresponding to the first data. In this solution, data that is in caches corresponding to virtual machines and that needs to be evicted as soon as possible may be determined by considering all virtual machines, to make data in the caches of the virtual machines be hot data as much as possible. In addition, the cache metadata may be updated in a timely manner such that the cache metadata keeps consistent with a status of the cache of the virtual machine in real time.

In another possible implementation, the determining the first data further includes determining the first data based on QoS parameters of the virtual machines or QoS parameters of virtual disks in the virtual machines.

In this solution, the physical machine may evict data in a cache of a virtual machine based on QoS parameters corresponding to different virtual machines.

In another possible implementation, the cache metadata further includes a cache status. The cache status is used to indicate whether data in the cache of the virtual machine is flushed to the physical disk. The method further includes determining, by the physical machine, second data from the caches of the N virtual machines, flushing the second data to the physical disk, and updating a cache status that is of the second data and that is in the cache metadata.

In this solution, the physical machine may comprehensively consider a status of each virtual machine, to determine data that is in caches of all virtual machines and that most needs to be flushed.

In another possible implementation, the method further includes modifying a range of the physical address allocated to the cache of the virtual machine, and updating the mapping relationships between the plurality of first physical addresses and the plurality of second physical addresses based on the modified range of the physical address allocated to the cache of the virtual machine. In this solution, an in-service modification can be made to the range of the physical address of the cache in the virtual machine without restarting the virtual machine such that the modification to the cache of the virtual machine can take effect in real time.

In another possible implementation, if the cache of the virtual machine is a write cache, the method further includes flushing and deleting third data in the cache of the virtual machine. During in-service scale-down of the cache of the virtual machine, an operation of writing data into the cache of the virtual machine is suspended to avoid a case in which cache space cannot be scaled down due to excessive data accumulated in the cache.

In another possible implementation, one second physical address corresponds to first physical addresses of a plurality of virtual machines. In this way, the first physical addresses of the plurality of virtual machines may be mapped to a same second physical address of the physical disk, and a part of the physical addresses in the physical disk may be used by caches of the plurality of virtual machines such that cache space can be reused, and cache costs can be reduced.

According to a second aspect, an embodiment of this application provides a physical machine. The physical machine includes a virtual machine, a front-end driver, a physical disk, a cache of the virtual machine, a virtual disk, and a memory of the virtual machine. The memory of the virtual machine stores cache metadata. The cache metadata includes a one-to-one mapping relationship between a plurality of virtual addresses and a plurality of first physical addresses. The virtual address is used to indicate a location in the virtual disk, and the first physical address is a physical address of the cache in the virtual machine.

The virtual machine is configured to send an operation request to the front-end driver, where the operation request includes a first virtual address, and is used to request to read or write data from or to a location that is in the virtual disk and that is indicated by the first virtual address.

The front-end driver is configured to obtain the operation request delivered by the virtual machine, if the cache metadata includes a target first physical address corresponding to the first virtual address, determine, based on preconfigured mapping relationships between the plurality of first physical addresses and a plurality of second physical addresses, a target second physical address corresponding to the target first physical address, where the second physical address is a physical address of a physical disk in the physical machine, and read or write the data from or to a location that is in the physical disk of the physical machine and that is indicated by the target second physical address.

In another possible implementation, the physical machine further includes a cache management module. The cache management module is configured to write the data into the cache of the virtual machine, where a location of the data in the cache of the virtual machine is represented as the target first physical address, determine, based on the preconfigured mapping relationships between the plurality of first physical addresses and the plurality of second physical addresses, the target second physical address corresponding to the target first physical address, and store a correspondence between the target first physical address and the first virtual address into the cache metadata.

In another possible implementation, the cache management module is further configured to allocate a part of physical addresses in the physical disk to the cache of the virtual machine, and establish the mapping relationships between the plurality of first physical addresses and the plurality of second physical addresses.

In another possible implementation, N virtual machines run on the physical machine, where N is a positive integer.

The cache management module is further configured to determine first data from caches of the N virtual machines, and delete the first data from caches of the N virtual machines.

The front-end driver is further configured to delete a mapping relationship, in the cache metadata, between a first physical address and a virtual address corresponding to the first data.

In another possible implementation, the management module is further configured to determine the first data based on QoS parameters of the virtual machines or QoS parameters of virtual disks in the virtual machines. The QoS parameter includes at least one of a reserved value of the cache, an upper limit of the cache, or a priority of the cache.

In another possible implementation, the N virtual machines run on the physical machine, where N is a positive integer. The cache metadata further includes a cache status, and the cache status is used to indicate whether data in the virtual cache is flushed to the physical disk. The cache management module is further configured to determine second data from the caches of the N virtual machines, and flush the second data to the physical disk. A processing module is further configured to update a cache status that is of the second data and that is in the cache metadata.

In another possible implementation, the cache management module is further configured to determine the second data based on the QoS parameters of the virtual machines or the QoS parameters of the virtual disks in the virtual machines. The QoS parameter includes at least one of the reserved value of the cache, the upper limit of the cache, or the priority of the cache.

In another possible implementation, the cache management module is further configured to modify a range of the physical address allocated to the cache of the virtual machine, and update the mapping relationships between the plurality of first physical addresses and the plurality of second physical addresses based on the modified range of the physical address allocated to the cache of the virtual machine.

According to a third aspect, an embodiment of this application provides a physical machine, where a virtual machine runs on the physical machine. A memory of the virtual machine stores cache metadata. The cache metadata includes a one-to-one mapping relationship between a plurality of virtual addresses and a plurality of first physical addresses. The virtual address is used to indicate a location in a virtual disk, and the first physical address is a physical address of a cache in the virtual machine. The physical machine includes an obtaining module configured to obtain an operation request delivered by the virtual machine, where the operation request includes a first virtual address, and is used to request to read or write data from or to a location that is in the virtual disk and that is indicated by the first virtual address, a processing module configured to, if the cache metadata includes a target first physical address corresponding to the first virtual address, determine, based on preconfigured mapping relationships between the plurality of first physical addresses and a plurality of second physical addresses, a target second physical address corresponding to the target first physical address, where the second physical address is a physical address of a physical disk in the physical machine, and a read/write module configured to read or write the data from or to a location that is in the physical disk of the physical machine and that is indicated by the target second physical address. In another possible implementation, the physical disk is a byte-based addressing storage medium.

In another possible implementation, the physical machine further includes a cache management module configured to if the cache metadata does not include the target first physical address corresponding to the first virtual address, write the data into the cache of the virtual machine, where a location of the data in the cache of the virtual machine is represented as the target first physical address, and determine, based on the preconfigured mapping relationships between the plurality of first physical addresses and the plurality of second physical addresses, the target second physical address corresponding to the target first physical address.

In another possible implementation, the physical machine further includes the cache management module. The cache management module is configured to, before a front-end driver obtains the operation request delivered by the virtual machine, allocate physical address space to the cache of the virtual machine, and establish the correspondences between the plurality of first physical addresses and the plurality of second physical addresses in the physical address space.

In another possible implementation, the cache management module is further configured to allocate a physical address to the cache of the virtual machine, and further, allocate a part of physical addresses in the physical disk to the cache of the virtual machine, and establish the mapping relationships between the plurality of first physical addresses and the plurality of second physical addresses.

In another possible implementation, N virtual machines run on the physical machine, where N is a positive integer. The physical machine includes the cache management module. The cache management module is configured to determine first data from caches of the N virtual machines, and delete the first data from the caches of the N virtual machines. The processing module is further configured to delete a correspondence, in the cache metadata, between a first physical address and a virtual address corresponding to the first data.

In another possible implementation, that the cache management unit is configured to determine the first data further includes determining the first data based on QoS parameters of the virtual machines or QoS parameters of virtual disks in the virtual machines. The QoS parameter includes at least one of the reserved value of the cache, the upper limit of the cache, or the priority of the cache.

In another possible implementation, the N virtual machines run on the physical machine, where N is a positive integer. The cache metadata further includes a cache status, and the cache status is used to indicate whether data in the virtual cache is flushed to the physical disk. The physical machine includes the cache management module. The cache management module is configured to determine second data from the caches of the N virtual machines, and flush the second data to the physical disk. The processing module is further configured to update a cache status that is of the second data and that is in the cache metadata.

In another possible implementation, the cache management module is further configured to modify a range of the physical address allocated to the cache of the virtual machine, and update the mapping relationships between the plurality of first physical addresses and the plurality of second physical addresses based on the modified range of the physical address allocated to the cache of the virtual machine.

In another possible implementation, one second physical address corresponds to first physical addresses of a plurality of virtual machines. In this way, the first physical addresses of the plurality of virtual machines may be mapped to a same second physical address of the physical disk, and a part of the physical addresses in the physical disk may be used by caches of the plurality of virtual machines such that cache space can be reused, and cache costs can be reduced.

According to a fourth aspect, an embodiment of this application provides a physical machine, including a processor and a computer-readable storage medium that stores a computer program. The processor is coupled to the computer-readable storage medium. When the computer program is executed by the processor, the virtualized cache implementation method in any possible implementation of the first aspect is implemented.

According to a fifth aspect, an embodiment of this application provides a computer-readable storage medium. The computer-readable storage medium stores a computer program. When the computer program is executed by a processor, the virtualized cache implementation method in any possible implementation of the first aspect is implemented.

According to a sixth aspect, an embodiment of this application provides a computer program product. When the computer program product runs on a computer, the computer is enabled to perform the virtualized cache implementation method in any possible implementation of the first aspect.

According to a seventh aspect, an embodiment of this application provides a chip. The chip includes a processor configured to support a physical machine in implementing the virtualized cache implementation method in any possible implementation of the first aspect.

DESCRIPTION OF EMBODIMENTS

Figure 1:
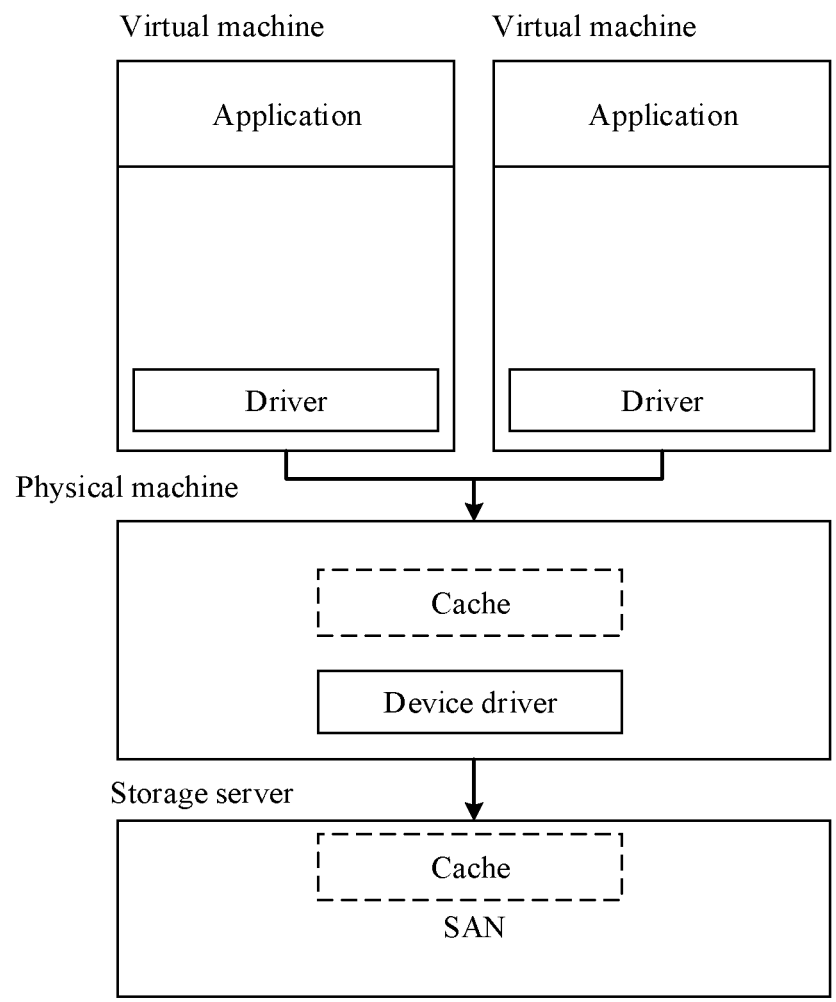
FIG. 1 is a schematic diagram of a virtualization system.

For ease of understanding, some concepts related to the embodiments of this application are provided as examples for reference. Details are as follows.

Virtualization overheads refer to a period of time spent by a central processing unit (CPU) in switching between a non-root mode (that is, a guest mode) and a root mode (that is, a kernel mode) in a virtualized cache implementation process. In a virtualization technology, in view of system security, a virtual machine usually cannot directly access various physical devices (for example, a network adapter and a disk device) on an apparatus. When an I/O operation (for example, read/write cache or read/write disk) needs to be performed, a sensitive instruction needs to be delivered, or an interrupt is generated, switching needs to be performed from the non-root mode to the root mode. In this case, a guest state area in the non-root mode, that is, a running status value of a CPU of the virtual machine, needs to be saved, for example, content stored in a register such as a control register (CR), a code segment (CS) register, a stack segment (SS) register, or a data segment (DS) register. After the I/O operation or sensitive instruction is processed, the CPU needs to switch from the root mode to the non-root mode. In this case, the CPU needs to load the guest state area saved when the CPU switches to the root mode. Saving and loading the guest state area makes the switching between the root mode and the non-root mode time-consuming.

A virtual disk is a disk in a remote computer virtualized from a local computer. The virtual disk is like a hard disk in the local computer. The virtual disk is one or more disks virtualized from a memory, and can speed up data exchange of the disks and improve a running speed of a computer.

A physical disk is a local disk in a physical machine.

A memory of a virtual machine enables the virtual machine to have its own memory space like a physical machine, and the memory space may be allocated by the physical machine to the virtual machine for use.

A cache of a virtual machine enables the virtual machine to have its own cache like a physical machine, and may store data frequently accessed by the virtual machine.

Read cache principle: Hot data on storage hardware, that is, frequently accessed data, is stored in a cache. In this way, when an application accesses the storage hardware, the hot data can be directly read from the cache, to improve read access performance.

Write cache principle: To-be-written data is first written into a cache. After a period of time, the data is flushed from the cache to a physical disk. In this way, when an application frequently writes data to a same area, the application frequently accesses the cache. This can improve write access performance.

Flush: write data in a cache to a physical disk.

The following describes the technical solutions in the embodiments of this application with reference to the accompanying drawings in the embodiments of this application. In the descriptions in the embodiments of this application, "l" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in the embodiments of this application, "a plurality of" means two or more than two.

According to a virtualized cache implementation method provided in an embodiment of this application, a cache of a virtual machine can be managed without switching between a non-root mode and a root mode by a virtual machine. This can reduce a period of time occupied by virtualization overheads and improve cache performance of the virtual machine.

Figure 2:
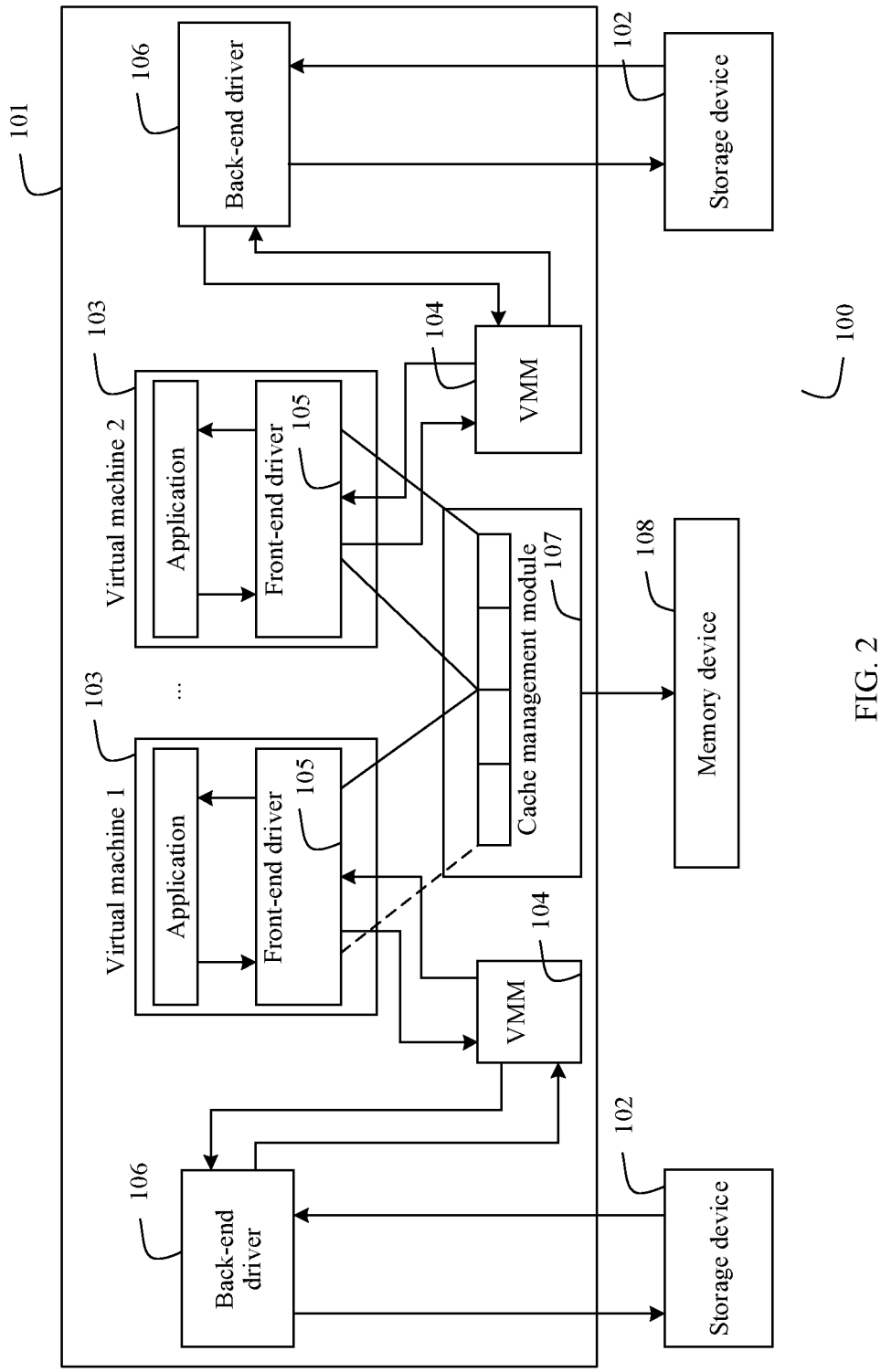
FIG. 2 is a schematic diagram of a virtualization system according to an embodiment of this application.

FIG. 2 is a schematic diagram of an architecture of a virtualization system 100 to which a virtualized cache implementation method according to an embodiment of this application is applicable. As shown in FIG. 2, the system 100 includes a physical machine 101 and a storage device 102. N (which is a positive integer) virtual machines 103, virtual machine monitors (VMMs) 104, front-end drivers 105 of the virtual machines, and back-end drivers (or a back-end driver) 106 of the virtual machines, and a cache management module 107 run on the physical machine 101.

A plurality of applications (APPs) run on each virtual machine 103, and may be configured to provide a plurality of application services for a user. The physical machine 101 may be configured to provide hardware support for the virtual machine 103. The virtual machine monitor 104, for example, an open-source system virtualization module, such as a Kernel-based Virtual Machine (KVM) module or a XEN module, is configured to manage a physical resource of the physical machine 101 and provide an interface for the virtual machine 103. The front-end driver 105 is configured to drive a virtual disk of the virtual machine, and cooperate with the cache management module 107 on the physical machine 101 to implement functions such as cache access, eviction, and flushing. The front-end driver 105 is further configured to manage a physical address for a cache of the virtual machine, and cache metadata, where the cache metadata is used to determine whether the cache of the virtual machine is hit. For example, the front-end driver 105 may be further configured to modify a range of physical address space for the cache of the virtual machine, access and update the cache metadata, and the like. The back-end driver 106 (for example, open-source software such as Quick EMUlator (QEMU)) is configured to simulate a virtual disk with a cache for the virtual machine, including parsing a cache configuration and a cache policy that are set by a user, for example, a cache size, a cache type, and a cache priority, simulating, for the virtual machine, a virtual disk that has a cache of the virtual machine and that matches the user configuration, and providing simulation of a first physical address required by the front-end driver 105, and is responsible for a management operation related to cache property modification in virtualization management, for example, initiating a task such as in-service cache scale-up or scale-down. The cache management module 107 is configured to manage all caches of the N virtual machines on the physical machine 101, and further perform management tasks such as cache allocation, cache eviction, cache flushing, cache size modification, cache property modification, and periodic cache status synchronization. The storage device 102 is configured to provide hardware storage for the physical machine 101 and the virtual machines 103.

The storage device 102 is a device configured to store information, and is usually a medium that digitizes the information and then uses the information in an electrical, magnetic, or optical form. The storage device 102 may be referred to as a physical disk. The storage device 102 may be further a part of the physical machine 101, or may be another device outside the physical machine 101. For example, the storage device 102 may be a hard disk drive (HDD), a solid-state drive (SSD), a SAN device, or the like.

In addition, the system 100 may further include another module, for example, a memory device 108. Details are not described herein. The memory device 108 is configured to provide memory for the physical machine 101 and the virtual machines 103, for example configured to provide memory space for the cache management module 107. The memory device 108 may be further a part of the physical machine 101, or may be another device outside the physical machine 101. For example, the memory device 108 may be a random-access memory (RAM), a non-volatile memory (NVM), or the like.

Figure 3:
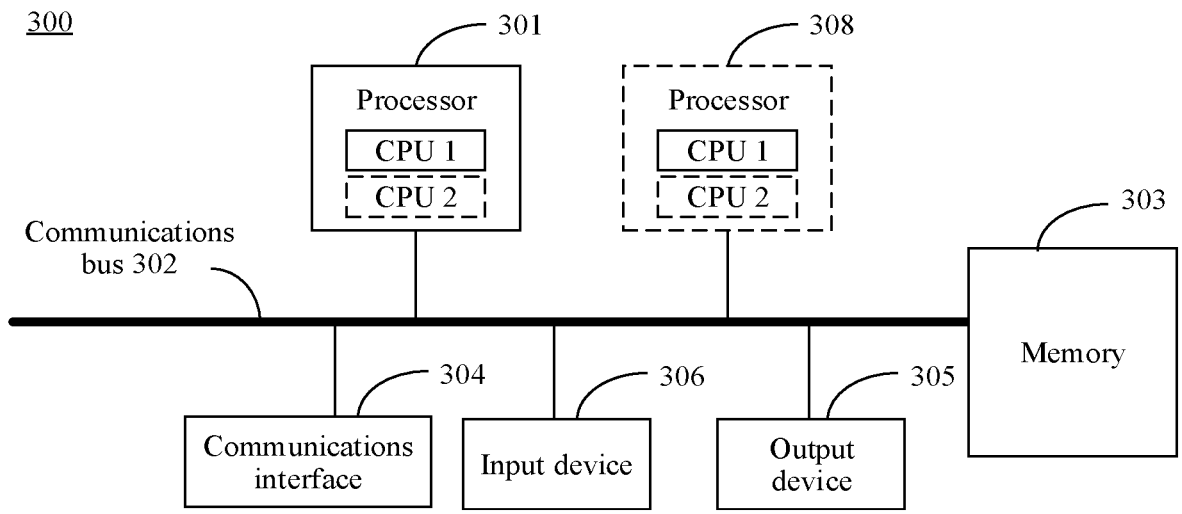
FIG. 3 is a schematic diagram of a structure of a device according to an embodiment of this application.

As shown in FIG. 3, the physical machine 101 in FIG. 2 may be implemented by a computer system 300 in FIG. 3. The computer system 300 includes at least one processor 301, a communications bus 302, a memory 303, and at least one communications interface 304.

The processor 301 may be a general-purpose CPU, a microprocessor, an application specific-integrated circuit (ASIC), or one or more integrated circuits configured to control program execution of the solutions of this application.

The communications bus 302 may include a path for transmitting information between the foregoing components.

The communications interface 304 uses any apparatus such as a transceiver and is configured to communicate with another device or a communications network such as the Ethernet, a radio access network (RAN), or a wireless local area network (WLAN).

The memory 303 may be a read-only memory (ROM) or another type of static storage device that can store static information and a static instruction, a RAM or another type of dynamic storage device that can store information and an instruction, an electrically erasable programmable ROM (EEPROM), a compact disc (CD) ROM (CD-ROM) or another compact disc storage, an optical disc storage (including a compact disc, a laser disc, an optical disc, a digital versatile disc (DVD), a BLU-RAY DISC, or the like), a magnetic disk storage medium or another magnetic storage device, or any other medium that can be used to carry or store expected program code in a form of an instruction or a data structure and that can be accessed by a computer. However, the memory 303 is not limited thereto. The memory 303 may exist independently, and is connected to the processor 301 through the bus 302. The memory 303 may alternatively be integrated with the processor 301.

The memory 303 is configured to store application program code for performing the solutions in this application, and the processor 301 controls the performing. The processor 301 is configured to execute the application program code stored in the memory 303, to implement a virtualized cache implementation method provided in the following embodiments of this application.

Optionally, the computer-executable instruction in the embodiments of this application may also be referred to as application program code. This is not limited in the embodiments of this application.

In specific implementation, in an embodiment, the processor 301 may include one or more CPUs, for example, a CPU 1 and a CPU 2 in FIG. 3. Each CPU may support a plurality of virtual CPUs, and the virtual CPU (VCPU).

In specific implementation, in an embodiment, the computer system 300 may include a plurality of processors such as the processor 301 and a processor 308 in FIG. 3. Each of the processors may be a single-core processor or a multi-core processor. The processor herein may be one or more devices, circuits, and/or processing cores for processing data (for example, a computer program instruction).

In specific implementation, in an embodiment, the computer system 300 may further include an output device 305 and an input device 306. The output device 305 communicates with the processor 301, and may display information in a plurality of manners. For example, the output device 305 may be a liquid-crystal display (LCD), a light-emitting diode (LED) display device, a cathode-ray tube (CRT) display device, a projector, or the like. The input device 306 communicates with the processor 301, and may receive input of a user in a plurality of manners. For example, the input device 306 may be a mouse, a keyboard, a touchscreen device, a sensing device, or the like.

The computer system 300 may be a general-purpose or dedicated communications device. A type of the computer system 300 is not limited in the embodiments of this application. In specific implementation, the computer system 300 may be a desktop computer, a portable computer, a network server, a personal digital assistant (PDA), a mobile phone, a tablet, a wireless terminal device, an embedded device, or a device with a structure similar to that in FIG. 3. All components in the computer system 300 may be deployed on a same computer device, or may be deployed on different computer devices located in a distributed system.

With reference to the virtualization system shown in FIG. 2, the following further describes, using an example in which the computer system 300 shown in FIG. 3 is a physical machine, the virtualized cache implementation method provided in the embodiments of this application.

An embodiment of this application provides a virtualized cache implementation method, which may be applied to a physical machine. N virtual machines run on the physical machine, where N is a positive integer. A memory of a virtual machine stores cache metadata, where the cache metadata includes a one-to-one mapping relationship between a plurality of virtual addresses and a plurality of first physical addresses. The virtual address is used to indicate a location in a virtual disk, and the first physical address is a physical address of a cache in the virtual machine.

Further, a segment of first physical address space, that is, physical address space represented by a physical address of the cache in the virtual machine, can be seen at a front end of the virtual machine. The cache metadata is stored in the memory of the virtual machine. In the cache metadata, one virtual address may correspond to one first physical address. In the cache metadata, a correspondence between a virtual address and a first physical address may be represented in a plurality of manners such as a mapping table or a tree structure. For example, for the mapping relationship between a virtual address and a first physical address, refer to Table 1.

TABLE 1

| Operation address | First physical address |
|---|---|
| Operation address 1 | First physical address 1 |
| Operation address 2 | First physical address 2 |
| ... | ... |

Figure 4:
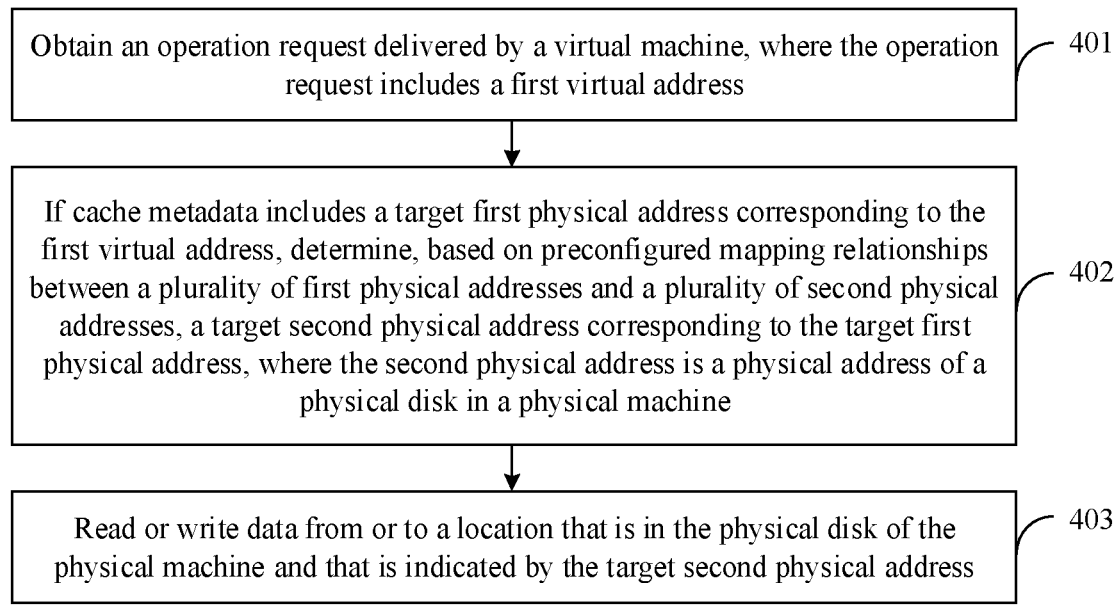
FIG. 4 is a flowchart of a virtualized cache implementation method according to an embodiment of this application.

Referring to FIG. 4, the virtualized cache implementation method provided in this embodiment of this application may include the following steps.

401: Obtain an operation request delivered by the virtual machine, where the operation request includes a first virtual address, and is used to request to read or write data from or to a location that is in the virtual disk and that is indicated by the first virtual address.

The operation request may also be referred to as an I/O request. The I request is an input request or a write request, and the O request is an output request or a read request. The operation request may be initiated by a storage-related application on the virtual machine, where the application runs on a VCPU. It may also be understood as that the VCPU delivers a storage-related operation request. In addition, because the VCPU runs on a CPU of the physical machine, it may be understood as that the CPU of the physical machine obtains the operation request.

The operation request includes the first virtual address, and the first virtual address is used to indicate the location that is in the virtual disk and from or to which the to-be-operated data is read or written. The first virtual address may be in a plurality of specific forms. For example, the first virtual address may be an offset O of the location that is in the virtual disk and from or to which the to-be-operated data is read or written, an offset O of the location that is in the virtual disk and from or to which the to-be-operated data is read or written and a length L of the to-be-operated data, a start address of the location that is in the virtual disk and from or to which the to-be-operated data is read or written, a start address and an end address of the location that is in the virtual disk and from or to which the to-be-operated data is read or written, a start address of the location that is in the virtual disk and from or to which the to-be-operated data is read or written and a length L of the to-be-operated data, or the like. This is not limited herein. The following uses an example in which the first virtual address is the offset O of the location that is in the virtual disk and from or to which the to-be-operated data is read or written and the length L of the to-be-operated data for description.

For example, the operation request is to read data corresponding to an offset of O and a length of L in a disk D. The disk D is the virtual disk of the virtual machine. "An offset of O and a length of L in a disk D" may represent the first virtual address, and represents that to-be-operated data (that is, the to-be-read data) is read from a location of an area with the offset of O and the length of L in the virtual disk D. The to-be-read data is data in the area with the offset of O and the length of L in the disk D.

For another example, the operation request is to write "hzujalbazkozujapzila" to a location with an offset of O in a disk D, where a data length is L. The disk D is the virtual disk of the virtual machine. "An offset of O in a disk D" or "an offset of O and a length of L in a disk D" represents the first virtual address, and represents that to-be-operated data (that is, the to-be-written data) is written into a location of an area with the offset of O and the length of L in the virtual disk D. The to-be-written data is the data "hzujalbazkozujapzila" with the length of L.

402: If the cache metadata includes a target first physical address corresponding to the first virtual address, determine, based on preconfigured mapping relationships between the plurality of first physical addresses and a plurality of second physical addresses, a target second physical address corresponding to the target first physical address, where the second physical address is a physical address of a physical disk in the physical machine.

The target first physical address is a first physical address corresponding to the first virtual address. If the cache metadata includes the target first physical address corresponding to the first virtual address, the cache of the virtual machine is hit. That is, the data requested by the operation request is in the cache of the virtual machine. In this case, the memory of the virtual machine stores the cache metadata, the cache metadata in the memory of the virtual machine may be directly accessed to check whether there is the target first physical address corresponding to the first virtual address, and mode switching does not need to be performed.

For example, when the operation request is to read the data corresponding to the offset of O and the length of L in the disk D, and the first virtual address is the offset of O and the length of L in the disk D, if the cache metadata includes a correspondence between a first physical address, and the offset of O and the length of L in the disk D, the cache of the virtual machine is hit. For another example, when the operation request is to write "hzujalbazkozujapzila" to the location with the offset of O in the disk D, where the data length is L, and the first virtual address is the offset of O and the length of L in the disk D, if the cache metadata includes a correspondence between a first physical address, and the offset of O and the length of L in the disk D, the cache of the virtual machine is hit. For example, if the target first physical address, in the cache metadata, corresponding to the first virtual address "an offset of O and a length of L in a disk D" is 0x1253, it may indicate that data in the location indicated by the first virtual address is stored in a location that is in the cache of the virtual machine and that is indicated by the first physical address 0x1253.

In this embodiment of this application, if the cache metadata includes the target first physical address corresponding to the first virtual address, the physical machine has allocated a cache to the virtual machine, the requested data is stored in the cache of the virtual machine, and the physical machine stores the preconfigured correspondences between the plurality of first physical addresses and the plurality of second physical addresses. The second physical address is a physical address of the physical disk that provides physical address space for the cache of the virtual machine. The physical disk may be the hardware storage device 102 (or referred to as a hardware storage medium) in the virtualization system shown in FIG. 2. For example, the hardware device may be an HDD, an SSD, a SAN device, or the like. The target second physical address is a second physical address corresponding to the target first physical address. In this case, the physical machine may search for, based on the stored correspondences between the plurality of first physical addresses and the plurality of second physical addresses, the target second physical address corresponding to the target first physical address.

In a specific implementation, a register of the CPU of the physical machine stores an Extended Page Table (EPT), used to store the correspondences between the plurality of first physical addresses and the plurality of second physical addresses. The CPU searches for, through the EPT, the target second physical address corresponding to the target first physical address.

For example, for the correspondences between the plurality of first physical addresses and the plurality of second physical addresses, refer to Table 2.

TABLE 2

| First physical address | Second physical address |
|---|---|
| First physical address 1 | Second physical address 1 |
| First physical address 2 | Second physical address 1 |
| First physical address 3 | Second physical address 2 |
| . . . | . . . |

It should be noted that, in this embodiment of this application, each first physical address may correspond to one second physical address, and each second physical address may correspond to one or more first physical addresses. When one second physical address corresponds to a plurality of first physical addresses, the physical machine may implement cache reuse. For details, refer to the following detailed description of cache reuse.

403: Read or write the data from or to a location that is in the physical disk of the physical machine and that is indicated by the target second physical address.

After determining the target second physical address corresponding to the target first physical address, the physical machine reads or writes, in the location indicated by the target second physical address, the to-be-operated data from or to the cache of the virtual machine such that read access or write access performance can be improved by accessing the cache of the virtual machine.

For example, when the operation request is to read the to-be-operated data corresponding to the offset of O and the length of L in the disk D, if the cache metadata includes the target first physical address corresponding to the offset of O and the length of L in the disk D, the physical machine searches for the target second physical address corresponding to the target first physical address, and reads the data from the location indicated by the target second physical address of the cache in the virtual machine.

For another example, when the operation request is to write "hzujalbazkozujapzila" to the location with the offset of O in the disk D, where the data length is L, if the cache metadata includes the target first physical address corresponding to the offset of O and the length of L in the disk D, the physical machine searches for the target second physical address corresponding to the target first physical address, and writes the data "hzujalbazkozujapzila" to the location indicated by the target second physical address of the cache in the virtual machine.

In the cache access process provided in this embodiment of this application, the physical machine does not need to switch between a non-root mode and a root mode, and when the cache metadata includes the target first physical address corresponding to the first virtual address of the to-be-operated data, can determine, based on the correspondences between the first physical addresses and the second physical addresses, the target second physical address corresponding to the target first physical address. Then the physical machine reads or write the data from or to the location indicated by the target second physical address of the cache in the virtual machine. This can save a period of time occupied by virtualization overheads and improve a cache access rate and cache access performance. That is, steps 401 to 403 can be completed in the non-root mode, and switching to the root mode does not need to be performed for execution.

In addition, in this embodiment of this application, the cache metadata may further include other information such as a cache type, a cache status, and an access time point. The cache type may be a read cache or a write cache. The cache status is used to indicate whether data in the cache has been flushed to the physical disk corresponding to the virtual disk. For example, data that is in the cache and that has not been flushed may be referred to as dirty data, and a corresponding cache state may be a dirty state. A cache state corresponding to data that is in the cache and that has been flushed may be a clean state. The access time point is used to indicate a time point at which cached data is most recently accessed. The physical machine can access the cache metadata to collect statistics about the cache such as cache usage, a cache hit rate, or a dirty rate, and manage the cache. For example, when the physical machine determines, based on a correspondence, in the cache metadata, between an operation address and a first physical address, that a proportion of used first physical addresses in all first physical addresses corresponding to the cache is greater than or equal to a first preset value, it may indicate that the cache usage is relatively high, and the current cache may be insufficient for use by the virtual machine. In this case, the physical machine may configure a larger cache. For another example, when the physical machine determines, based on the cache status in the cache metadata, that the dirty rate is greater than or equal to a second preset value, the physical machine may trigger a flushing operation to avoid an overflow caused by accumulation of dirty data in the cache.

It should be noted that the cache metadata is stored in the memory of the virtual machine instead of a storage device of the physical machine. Therefore, the cache metadata can be directly accessed to collect statistics about the cache, without switching between the non-root mode and the root mode. This can save a period of time occupied by virtualization overheads and improve processing efficiency.

If the cache metadata does not include a correspondence between the first virtual address and the target first physical address, the cache of the virtual machine is missed. This scenario may include two cases: 1. The physical machine has allocated a cache to the virtual machine, but the cache metadata does not include the correspondence between the first virtual address and the target first physical address. 2. The physical machine has not allocated a cache to the virtual machine.

After a first operation area is accessed this time, there is a relatively high probability that the first operation area is accessed again. Therefore, when the cache of the virtual machine is missed, the physical machine may write to-be-operated data into the cache of the virtual machine such that the cache of the virtual machine can be hit during subsequent access to the data. In this way, the data in the cache of the virtual machine can be directly accessed without virtualization overheads, and access performance is improved. Further, referring to FIG. 5, if the cache of the virtual machine is missed, the virtualized cache implementation method provided in this embodiment of this application may further include the following steps.

404: Write the data into the cache of the virtual machine, where a location of the data in the cache of the virtual machine is represented as the target first physical address, and determine, based on the preconfigured mapping relationships between the plurality of first physical addresses and the plurality of second physical addresses, the target second physical address corresponding to the target first physical address.

If the cache of the virtual machine is missed, the to-be-operated data is written into the cache of the virtual machine, and a write location, that is, the target first physical address, is obtained. Further, if the cache of the virtual machine is missed, the physical machine may switch from the non-root mode to the root mode and then perform steps 404 and 405.

405: Store a mapping relationship between the target first physical address and the first virtual address into the cache metadata.

After the to-be-operated data is written to the location, represented by the target first physical address, in the cache of the virtual machine, the target second physical address corresponding to the target first physical address may be determined based on the preconfigured correspondences between the first physical addresses and the second physical addresses. Then the correspondence between the first virtual address and the target first physical address is stored into the cache metadata. In this way, after receiving an operation request carrying the first virtual address next time, the physical machine may determine that the cache of the virtual machine is hit, and directly access the cache of the virtual machine based on the method described in steps 402 and 403.

When the operation request is a read request, if the cache of the virtual machine is missed, before step 404 is performed, after switching from the non-root mode to the root mode is performed, the to-be-operated data may be further read from the location indicated by the first virtual address. Then in step 404, the data read from the location indicated by the first virtual address may be written into the cache of the virtual machine.

In some other embodiments of this application, the physical machine includes a front-end driver, a back-end driver, and a cache management module (CMM). A communication channel is established between the modules. The virtualized cache implementation method in steps 401 to 405 is implemented through cooperation among the front-end driver, the back-end driver, and the CMM. The following separately uses a read cache access procedure and a write cache access procedure as examples for description.

Figure 6:
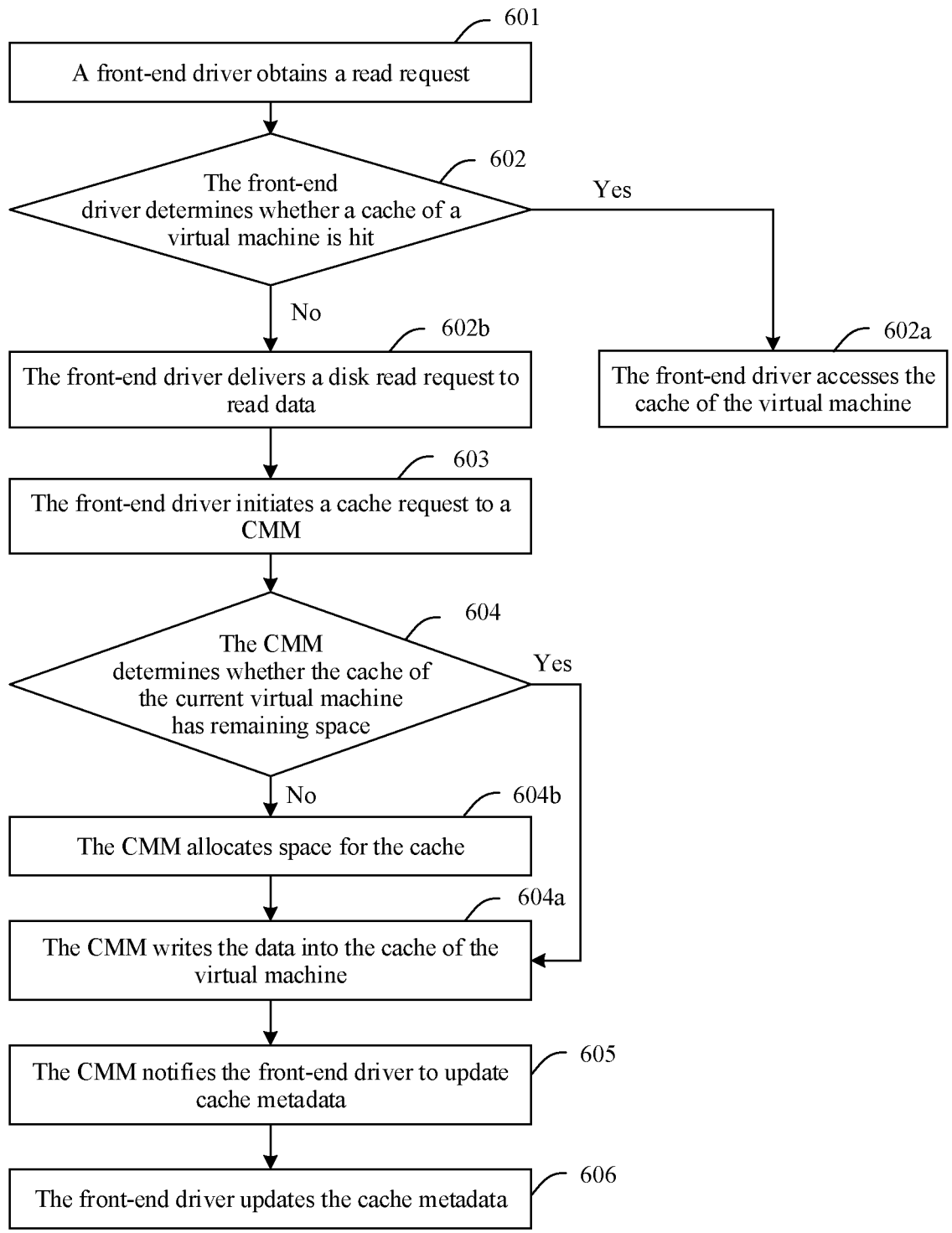
FIG. 6 is a schematic diagram of still another virtualized cache implementation method according to an embodiment of this application.

Another embodiment of this application provides a virtualized read cache implementation method. As shown in FIG. 6, the method may include the following steps.

601: A front-end driver obtains a read request delivered by a virtual machine.

For example, the read request is to read content corresponding to an offset of O and a length of L in a disk D, and a first virtual address is the offset of O and the length of L in the disk D.

The virtual machine is configured to send the read request to the front-end driver. The read request includes the first virtual address, and is used to request to read data from a location that is in a virtual disk and that is indicated by the first virtual address.

602: The front-end driver determines whether cache metadata includes a target first physical address corresponding to the first virtual address.

Further, the front-end driver determines whether the cache metadata includes the target first physical address corresponding to the offset of O and the length of L in the disk D. If yes, a cache of the virtual machine is hit. If no, a cache of the virtual machine is missed.

602a: If the cache metadata includes the target first physical address corresponding to the first virtual address, the cache of the virtual machine is hit, and the front-end driver requests to access data in the target first physical address, in the cache of the virtual machine, corresponding to the first virtual address (that is, the offset of O and the length of L in the disk D). The front-end driver searches for a target second physical address corresponding to the target first physical address, reads data in the target second physical address of the virtual cache, and updates an access time point, in the cache metadata, of the cached data to a current time point. It can be learned that mode switching is not required in the process of accessing the cache of the virtual machine, and there is no virtualization entry/exit overhead.

602b: If the cache metadata does not include the target first physical address corresponding to the first virtual address, the cache of the virtual machine is missed, and the front-end driver delivers a disk read request and switches to a root mode to read data in the disk.

If the cache of the virtual machine is missed, after step 602b is performed, the method may further include the following steps.

603: The front-end driver initiates a cache request to a CMM.

Further, the front-end driver transfers the cache request to the CMM over a communication channel between the front-end driver and the CMM. For example, the cache request is to cache the data, where the to-be-cached data corresponds to the offset of O and the length of L in the disk D.

In view of a limited size of the cache of the virtual machine, in some cases, the front-end driver does not initiate the cache request. For example, it is assumed that a physical machine configures 10 gigabytes (GB) space for each of caches of N virtual machines based on a user's configuration. If the 10 GB space is used up, the front-end driver does not initiate the cache request to the CMM. If the space of the cache is not used up, the front-end driver may initiate the cache request to the CMM.

604: After receiving the cache request, the CMM determines whether the cache of the current virtual machine has remaining space.

604a: If the cache of the current virtual machine has remaining space, the CMM writes the read data into the cache of the current virtual machine. For example, if the physical machine configures 100 megabytes (MB) space for the cache of the current virtual machine based on a user's configuration and 60 MB space has not been used, the CMM does not need to allocate space again, can directly write the read data into the 60 MB space, and mark space into which the data is written as used.

604b: If the cache of the current virtual machine has no remaining space, the CMM allocates space for the cache again, and then writes the read data into the cache of the virtual machine. For example, if the allocated 100 MB space is not available, the CMM may allocate 100 MB space for the cache again, and then write the read data into the new 100 MB space, and mark space into which the data is written as used.

In this step, the cache of the virtual machine is allocated by the CMM. An allocation algorithm may be based on a cache type, such as a read cache or a write cache, selected by a user. An appropriate storage medium is selected as cache hardware, and may be a memory, an NVM high-speed storage device, or a byte-based addressing storage device.

After writing the read data into the cache of the current virtual machine, the CMM may obtain the target first physical address of the written data in the cache of the virtual machine.

605: The CMM notifies the front-end driver to update the cache metadata.

After switching is performed from the root mode back to a non-root mode, the CMM notifies the front-end driver to update the cache metadata.

606: After receiving the notification from the CMM, the front-end driver updates the cache metadata.

Content updated by the front-end driver includes storing a correspondence between the target first physical address and the first virtual address, and updating a cache access time point to a current time point.

Subsequently, when a read access to the first virtual address is requested again, in step 602, a process in which the cache of the virtual machine is hit is performed. That is, step 602a is performed. The cache of the virtual machine can be directly accessed without mode switching.

Figure 7:
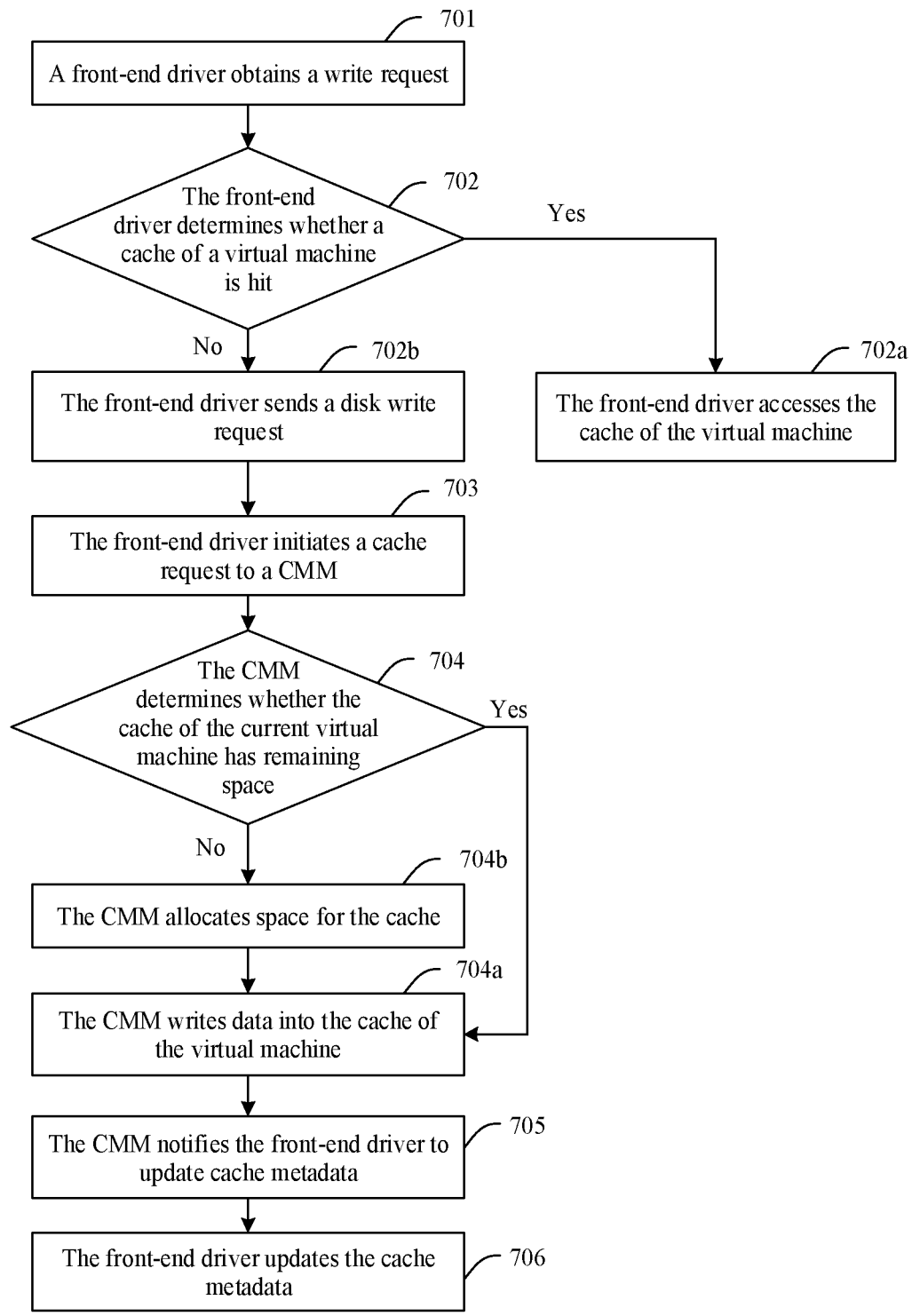
FIG. 7 is a flowchart of yet another virtualized cache implementation method according to an embodiment of this application.

Another embodiment of this application provides a virtualized write cache implementation method. The method is implemented through mutual cooperation among modules such as a front-end driver, a back-end driver, and a cache management module in a physical machine. As shown in FIG. 7, the method includes the following steps.

701: The front-end driver obtains a write request delivered by a virtual machine.

For example, the write request is to write "hzujalbazkozujapzila" to a location with an offset of O in a disk D, where a data length is L.

702: The front-end driver determines whether cache metadata includes a target first physical address corresponding to a first virtual address.

Further, the front-end driver determines whether the cache metadata includes the target first physical address corresponding to the offset of O and the length of L in the disk D.

702a: If the cache metadata includes the target first physical address corresponding to the first virtual address, a cache of the virtual machine is hit, and the front-end driver requests to access data in the target first physical address, in the cache of the virtual machine, corresponding to the first virtual address (that is, the offset of O and the length of L in the disk D). The front-end driver searches for a target second physical address corresponding to the target first physical address, writes the data to a location, in the virtual cache, indicated by the target second physical address, and updates a cache status, in the cache metadata, of a data block corresponding to the target second physical address to a dirty state. It can be learned that mode switching is not required in the process of accessing the cache of the virtual machine, and there is no virtualization entry/exit overhead.

702b: If the cache metadata does not include the target first physical address corresponding to the first virtual address, a cache of the virtual machine is missed, and the front-end driver delivers a disk write request and switches from a non-root mode to a root mode.

If the cache of the virtual machine is missed, after step 702b is performed, the method may further include the following steps.

703: The front-end driver initiates a cache request to the CMM.

Further, the front-end driver transfers the cache request to the CMM over a communication channel between the front-end driver and the CMM. For example, the cache request is to write the data, where the to-be-written data corresponds to the offset of O and the length of L in the disk D.

Like the case described in step 603, the front-end driver may initiate the cache request in some cases, and cannot initiate the cache request in another case. If the front-end driver cannot initiate the cache request, the physical machine writes the to-be-written data onto a physical disk.

704: After receiving the cache request, the CMM determines whether the cache of the current virtual machine has remaining space.

704a: If the cache of the current virtual machine has remaining space, the CMM writes the read data into the cache of the current virtual machine.

704b: If the cache of the current virtual machine has no remaining space, the CMM allocates space for the cache again, and then writes the read data into the cache of the virtual machine.

After writing the to-be-written data into the cache of the current virtual machine, the CMM may obtain the target first physical address of the written data in the cache of the virtual machine.

705: The CMM notifies the front-end driver to update the cache metadata.

After switching is performed from the root mode back to the non-root mode, the CMM notifies the front-end driver to update the cache metadata.

706: After receiving the notification from the CMM, the front-end driver updates the cache metadata.

Content updated by the front-end driver includes storing a correspondence between the target first physical address and the first virtual address, and updating a cache status to a dirty state.

Subsequently, when a write access to the first virtual address, that is, the offset of O and the length of L in the disk D, is requested again, in step 702, a process in which the cache of the virtual machine is hit is performed. That is, step 702*a* is performed. The cache of the virtual machine can be directly accessed without mode switching.

Figure 8:
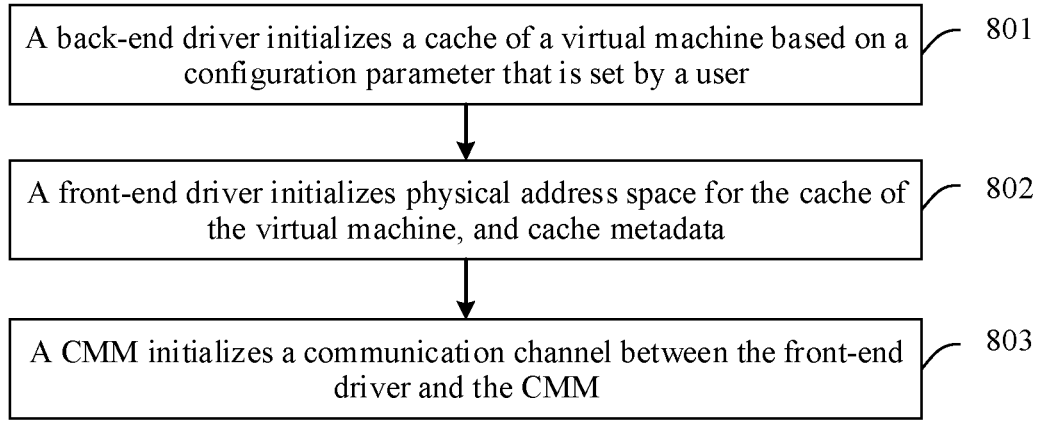
FIG. 8 is a flowchart of still yet another virtualized cache implementation method according to an embodiment of this application.

To simulate, for the virtual machine, a virtual disk with the cache of the virtual machine, the virtualized cache implementation method provided in this embodiment of this application may further include a cache initialization process. After a user or an administrator configures a cache policy, the cache initialization process is triggered when the virtual machine is started or the virtual disk is mounted. The cache policy configured by the user or the administrator may include a cache size of the virtual machine, a cache type (read cache/write cache) of the virtual machine, a cache priority of the virtual machine, and the like. Further, as shown in FIG. 8, the cache initialization process may include the following steps.

801: The back-end driver initializes the cache of the virtual machine based on a cache configuration that is set by the user.

Further, that the back-end driver initializes the cache of the virtual machine may include initializing a range of first physical address space accessible to the virtual machine, the cache priority, and the like, and transferring a parameter related to the cache configuration to the CMM.

802: The front-end driver initializes physical address space in the cache of the virtual machine, and the cache metadata.

Further, after the back-end driver initializes the range of the first physical address space accessible to the virtual machine, the front-end driver also initializes the range of the first physical address (that is, physical address of the cache in the virtual machine) space. In addition, the front-end driver applies for a segment of memory space of the virtual machine to store the cache metadata, and initializes the cache metadata. During the initialization, the cache metadata is initialized to be invalid. With subsequent use of the cache of the virtual machine by the virtual machine, the cache metadata is dynamically updated: information such as a correspondence between a first physical address and an operation address, a cache status, and an access time point is stored. In this way, the cache metadata is switched from the invalid state to a valid state for use during cache access.

803: The CMM initializes the communication channel between the front-end driver and the CMM.

There may be various communication channels between the front-end driver and the CMM, for example, a shared memory communication channel or a socket communication channel. The initializing the communication channel herein is to initialize a shared memory connection, a socket connection, or the like.

In addition, in the initialization process, a communication channel between the front-end driver and the back-end driver, and a communication channel between the back-end driver and the CMM may be further initialized. Details are not described herein.

In the embodiments of this application, a physical machine may manage all caches of N virtual machines, and allocate a cache resource for the N virtual machines such that cache management is more flexible and cache costs are lower. For example, the management may include tasks such as cache allocation, cache eviction, cache flushing, cache size modification, cache property modification, and cache reuse. A cache property includes a cache type and a cache priority, and the cache type includes a read cache and a write cache.

Optionally, the physical machine may manage all caches of the virtual machines based on QoS parameters of the virtual machines or QoS parameters of virtual disks included in the virtual machines, to provide a better cache service for each virtual machine. The QoS parameter may include at least one of parameters such as a reserved value of the cache, an upper limit of the cache, or a priority of the cache.

The cache management tasks are separately described as follows.

A. Cache Allocation:

In the embodiments of this application, before a cache of a virtual machine is accessed, the cache may be further allocated to the virtual machine such that the virtual machine can use the cache in a running process. The cache allocation is to create a segment of physical address space from hardware, on a physical machine, that currently provides a high-performance storage service, and establish a mapping relationship between a first physical address and a second physical address in the physical address space.

Figure 5:
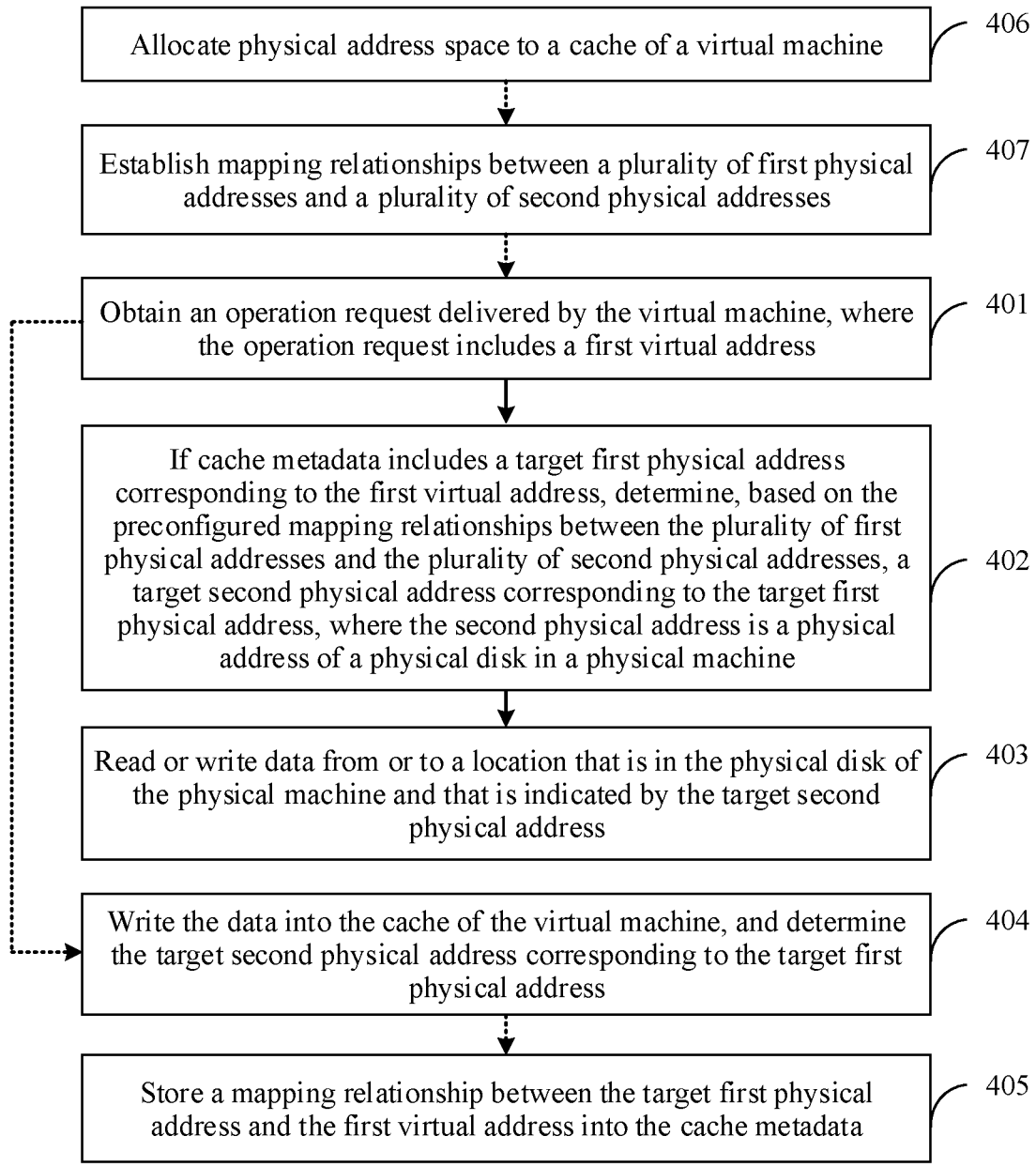
FIG. 5 is a flowchart of another virtualized cache implementation method according to an embodiment of this application.

In one case, the cache may be allocated to the virtual machine during the foregoing cache initialization. In this case, as shown in FIG. 5, before step 401 is performed, the method may further include the following.

406: The CMM allocates physical address space to the cache of the virtual machine, that is, allocates a part of physical addresses in the physical disk to the cache of the virtual machine.

407: The CMM establishes the mapping relationships between the plurality of first physical addresses and the plurality of second physical addresses.

In another case, the physical machine may dynamically allocate a cache to the virtual machine when the cache of the virtual machine needs to be accessed. Before step 404 is performed, if the physical machine has not allocated a cache to the virtual machine, the physical machine performs steps 406 and 407, to allocate a cache to the virtual machine when necessary.

Steps 406 and 407 are mainly performed by the CMM in the physical machine.

In step 406, the CMM allocates the physical address space to the cache of the virtual machine. Further, the CMM selects appropriate storage hardware to simulate the cache based on a cache configuration of a user and a feature of storage hardware on the physical machine. Further, the CMM may comprehensively consider and allocate physical address space to the N virtual machines, consider storage hardware as a cache medium of a virtual machine with reference to the cache configuration that is set by the user, and allocate a cache resource for the N virtual machines, to reduce cache costs.

In addition, a cache may be further allocated to a virtual machine based on a QoS parameter of the virtual machine or a QoS parameter of a virtual disk included in the virtual machine. For example, a cache may be preferentially allocated to a virtual machine with a high priority in the N virtual machines, to ensure that the virtual machine with the high priority uses the cache. Alternatively, considering that there may be a plurality of virtual disks on a virtual machine, a part of cache space may be reserved for a virtual disk with a high priority in the virtual machine. The cache space cannot be used by a virtual machine or a virtual disk with a low priority such that a cache can be allocated in a timely manner when a cache for the virtual disk with the high priority needs to be used.

In step 407, the CMM establishes the correspondences between the plurality of first physical addresses and the plurality of second physical addresses. Further, the CMM establishes the mapping relationships between the second physical addresses and the first physical addresses using a byte-based mapping technology such as an INTEL hardware-assisted virtualization technology (VT).

Figure 9:
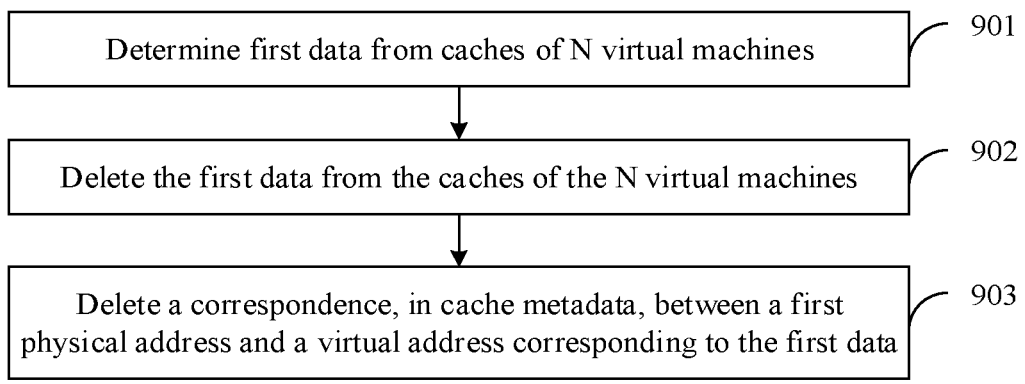
FIG. 9 is a flowchart of a further virtualized cache implementation method according to an embodiment of this application.

B. Cache Eviction:

According to the virtualized cache implementation method in the foregoing embodiments, data may be added to a cache of a virtual machine. When the cache of the virtual machine is a read cache, if data is continuously added to the cache of the virtual machine, the cache of the virtual machine may overflow. To enable the cache of the virtual machine to store hot data in real time, data that is not accessed for a long time in the cache may be evicted according to a preset eviction policy such that the cache of the virtual machine has sufficient space to receive new hot data. As shown in FIG. 9, N virtual machines run on a physical machine, where N is a positive integer, and a cache eviction process may include the following steps.

901: A CMM determines first data from caches of the N virtual machines.

The CMM may determine the to-be-evicted first data from the caches of the N virtual machines according to a first preset policy, where the first data is data that needs to be evicted from a cache of at least one virtual machine. In a specific implementation, the CMM may first determine data that needs to be evicted from each of the N virtual machines, and then determine the first data from the data.

In another specific implementation, the CMM may first determine M (M is less than or equal to N) virtual machines from the N virtual machines, and then determine data that needs to be evicted from the M virtual machines, where the data that needs to be evicted from the M virtual machines is the first data. That is, the CMM may comprehensively consider a status of a cache of each virtual machine, and more effectively and accurately determine data, in a cache of a virtual machine, that is non-hot data that needs to be evicted as soon as possible, to evict the data. For example, the CMM may determine the first data based on a least recently used (LRU) algorithm, a least frequently used (LFU) algorithm, or a first in first out (FIFO) algorithm.

In addition, in the embodiments of this application, cache metadata further stores a correspondence between an access time point and a first physical address. The access time point in the cache metadata may be used to determine a time point at which data, in a cache, corresponding to the first physical address is most recently accessed, to determine data that needs to be evicted from the cache.

Optionally, the CMM may determine the first data that needs to be evicted, based on QoS parameters of the virtual machines or QoS parameters of virtual disks in the virtual machines, where the QoS parameter includes at least one of a reserved value of a cache, an upper limit value of the cache, or a priority of the cache. For example, data in a cache of a virtual machine with a low priority may be preferentially evicted, data in a cache for a virtual disk with a low priority may be preferentially evicted, data in a cache, of a virtual machine, with a small upper limit may be preferentially evicted, or data in a cache, of a virtual machine, with a small reserved value may be preferentially evicted.

902: The CMM deletes the first data from the caches of the N virtual machines.

903: A front-end driver deletes a mapping relationship, in the cache metadata, between a first physical address and a virtual address corresponding to the first data.

After the first data is deleted from the caches of the N virtual machines, the first data is not in the caches of the virtual machines. Therefore, the correspondence, in the cache metadata, between the first physical address and the operation address corresponding to the first data may be deleted. A correspondence, in the cache metadata, between an operation address and a first physical address is updated in a timely manner such that the correspondence in the cache metadata keeps consistent with a current data cache status in the caches of the virtual machines in real time. In addition, this further facilitates accurate collection of statistics about the cache such as cache usage and a cache hit rate, and cache management that are performed based on the cache metadata. After the first data is deleted, a cache resource occupied by the first data may be further released for use by another virtual machine. If the other virtual machine has hot data, the data may be added to the released cache resource.

Figure 10:
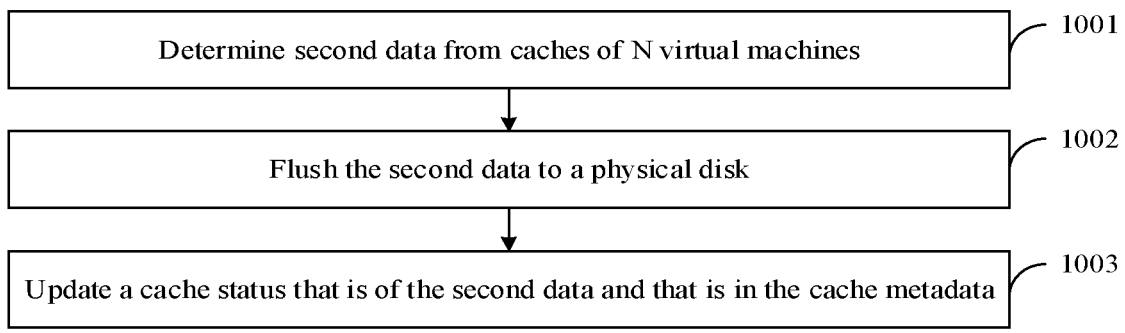
FIG. 10 is a flowchart of a still further virtualized cache implementation method according to an embodiment of this application.

C. Cache Flushing:

According to the virtualized cache implementation method in the foregoing embodiments, data may be added to a cache of a virtual machine. For a write cache, a write request delivered by a virtual machine may be preferentially placed in a cache medium of the cache of the virtual machine, to improve write access performance. However, cache space is limited. In addition, the cache medium may be volatile. Consequently, when a physical machine is powered off or another case occurs, data in the cache medium is lost. Therefore, the cache of the virtual machine needs to flush, to a physical disk in a timely manner, data written into the virtual machine, to ensure reliability and availability of the cache of the virtual machine. The physical disk may be a physical storage medium in the storage device 102 shown in FIG. 2. Cache flushing may include active flushing and periodic flushing. Active flushing usually occurs when key data is written into the virtual machine. In this case, the virtual machine actively triggers a flushing operation to ensure that the data is written onto the disk in a timely manner. Periodic flushing is to periodically flush data in the cache of the virtual machine to the physical disk. As shown in FIG. 10, the cache eviction flushing method includes the following.

1001: A CMM determines second data from caches of N virtual machines.

The CMM may determine the to-be-flushed second data from the caches of the N virtual machines according to a second preset policy, where the second data is data that is in a cache of at least one virtual machine and that needs to be flushed. In a specific implementation, a physical machine may first determine data, in the N virtual machines, that needs to be flushed, and then determine the second data from the data. In another specific implementation, the physical machine may first determine M (M is less than or equal to N) virtual machines in which data needs to be flushed, and then determine data that is in the M virtual machines and that needs to be flushed, where the data that is in the M virtual machines and that needs to be flushed is the second data. That is, the physical machine may comprehensively consider a status of a cache of each virtual machine, and more effectively and accurately determine data, in a cache of a virtual machine, that needs to be flushed to the physical disk as soon as possible. For example, the physical machine may determine, based on an access time point in cache metadata, data that is first written into the caches of the N virtual machines and whose cache status is a dirty state, where the data needs to be flushed to the physical disk as soon as possible.

Optionally, the second data that needs to be flushed is determined based on QoS parameters of the virtual machines or QoS parameters of virtual disks in the virtual machines. For example, the physical machine may preferentially flush data in a cache of a virtual machine with a high priority, data in a cache for a virtual disk with a high priority, data in a cache, of a virtual machine, with a small upper limit, or the like.

1002: The CMM flushes the second data to the physical disk.

In this step, the determined to-be-flushed second data is written into the physical disk.

1003: A front-end driver updates a cache status that is of the second data and that is in the cache metadata.

After the second data is flushed from the caches to the physical disk, the cache status that is of the second data and that is in the cache metadata may be changed from a dirty state to a clean state, to indicate that the second data has been flushed to the physical disk. Information about a cache status in the cache metadata is updated in a timely manner such that the cache status keeps consistent with a current status of data in the caches of the virtual machines in real time. This can further facilitate accurate collection of statistics about the caches such as a cache dirty rate and cache management that are performed by the physical machine based on the cache metadata.

In this embodiment of this application, when a user or an administrator modifies a cache configuration, the CMM may make an in-service modification to content such as a size of a cache of a virtual machine and a property of the cache of the virtual machine based on the modified cache configuration such that a cache resource is more flexibly used. The "in-service" modification means that the modification to the cache of the virtual machine can be implemented without restarting the physical machine or the virtual machine such that the modification can take effect immediately. The following describes cache size modification and cache property modification.

Figure 11:
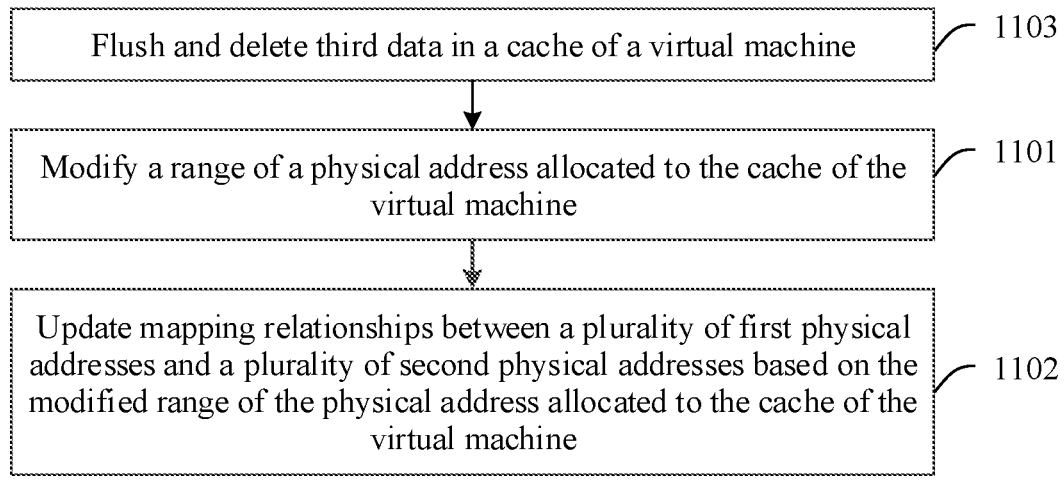
FIG. 11 is a flowchart of a yet further virtualized cache implementation method according to an embodiment of this application.

D. In-Service Modification to a Size of a Cache:

As shown in FIG. 11, a cache size modification method provided in the embodiments of this application may include the following steps.

1101: The CMM modifies a range of the physical address allocated to the cache of the virtual machine.

When a size of the cache of the virtual machine needs to be modified, the CMM may modify the range of first physical address space corresponding to the cache, where the first physical address space is the part of the physical addresses in the physical disk that is allocated to the cache of the virtual machine. For example, when the cache of the virtual machine needs to be scaled up, the CMM changes the range of the physical address of the cache in the virtual machine from 0x001-0x100 to 0x001-0x200. When the cache of the virtual machine needs to be scaled down, the CMM changes the range of the first physical address of the cache in the virtual machine from 0x001-0x100 to 0x001-0x050. When the cache of the virtual machine needs to be scaled up, the range of the first physical address of the cache in the virtual machine is extended. When the cache of the virtual machine needs to be scaled down, the range of the first physical address of the cache in the virtual machine is narrowed.

1102: The CMM updates the mapping relationships between the plurality of first physical addresses and the plurality of second physical addresses based on the modified range of the physical address allocated to the cache of the virtual machine.

The CMM updates the correspondences between the second physical addresses and the first physical addresses based on the modified range of the first physical address. In this way, the front-end driver can determine, in real time based on the updated correspondences between the second physical addresses and the first physical addresses, the target second physical address corresponding to the target first physical address, to directly obtain data based on the target second physical address and implement a virtualized cache.

In addition, when the cache, of the virtual machine, whose size is to be modified is a write cache and needs to be scaled down, before step 1101 is performed, the cache size modification method may further include the following.

1103: The CMM flushes and deletes third data in the cache of the virtual machine.

Before the scale-down, the CMM needs to first flush and delete the third data in to-be-deleted cache space, to ensure that the data in the to-be-deleted cache space is not lost.

After the scale-down is completed, the physical machine may resume an operation of writing data into the cache of the virtual machine, and the virtual machine can normally use the cache.

E. In-Service Modification to a Property of a Cache:

Another embodiment of this application provides a method for modifying a property of a cache. The property of the cache may include a priority of the cache and a type of the cache. The method may be implemented through mutual cooperation among a front-end driver, a back-end driver, and a cache management module of a physical machine. Although not shown in the accompanying drawings, the method may include notifying, by the back-end driver, the CMM to modify the priority of the cache or the type of the cache, and modifying, by the CMM, the priority of the cache or the type of the cache.

If a write cache needs to be changed to a read cache, the write cache may be changed to the read cache after a cache flushing procedure is triggered to write dirty data onto a physical disk. In addition, the front-end driver may further update the type of the cache in cache metadata in a timely manner such that the cache metadata keeps consistent with a status of the modified cache of the virtual machine in real time.

Figure 12:
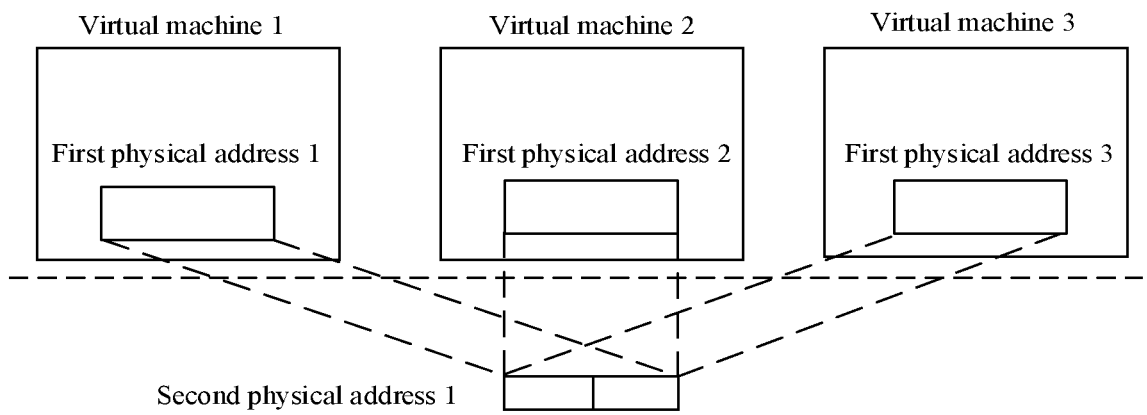
FIG. 12 is a diagram of a correspondence between a first physical address and a second physical address according to an embodiment of this application.

F. Cache Reuse:

In the embodiment of this application, in the correspondences between the first physical addresses and the second physical addresses, as shown in FIG. 12, one second physical address may correspond to first physical addresses of a plurality of virtual machines. In this way, a same second physical address may be used by caches of a plurality of virtual machines such that physical cache space can be reused, and cache costs can be reduced. In a cache reuse scenario, a plurality of virtual machines share a virtual disk such that caches of the plurality of virtual machines correspond to a same second physical address. This facilitates use of a cache reuse technology.

Another embodiment of this application provides a cache reuse method, implemented through mutual cooperation among a front-end driver, a back-end driver, and a cache management module of a physical machine. Although not shown in the accompanying drawings, the method may include the following steps.

1201: When a front-end driver of a first virtual machine delivers a read request to a back-end driver, a CMM determines whether cache metadata of N virtual machines on a physical machine includes a target first physical address corresponding to a first virtual address in the read request.

1202: If cache metadata for a cache of a second virtual machine includes a first physical address 1 corresponding to the first virtual address in the read request, and the first physical address 1 corresponds to a second physical address 1, the CMM establishes a correspondence between a first physical address 2 and the second physical address 1.

1203: The CMM notifies the front-end driver to update cache metadata.

1204: The front-end driver completes update of the cache metadata, where update content includes storing a correspondence between the first virtual address and the first physical address 2, and updating a cache access time point to a current time point.

In this way, a correspondence between the second physical address 1, and the first virtual address and the first physical address 2 that correspond to the first virtual machine is established. For the second virtual machine, there is a correspondence between the first virtual address, the first physical address 1, and the second physical address 1. That is, the two virtual machines may share the second physical address 1. Therefore, when a plurality of virtual machines accesses a same second physical address, the same second physical address is mapped to first physical addresses of the plurality of virtual machines. This can implement cache reuse.

The virtualized cache implementation method provided in the embodiments of this application may further implement a technology similar to the cache reuse, such as cache deduplication, to reduce costs of a cache of a virtual machine. Cache deduplication is to delete duplicate data in a cache. Cache deduplication may include inline deduplication and offline deduplication. Inline deduplication means that when data is written into a cache of a virtual machine, it is determined whether same data already exists in another area, and if yes, a mapping relationship between a first physical address and a second physical address is directly modified. Offline deduplication means that there is a scheduled task on a physical machine, where the task is to periodically scan data in caches of N virtual machines, and if same data is found, a mapping relationship between a first physical address and a second physical address is modified, and a plurality of first physical addresses are mapped to a same second physical address.

It should be noted that in the embodiments of this application, a storage device usually used for storage may provide storage space for a cache of a virtual machine. In addition, the storage device may be a byte-based addressing device. When a storage device is used to provide storage space for a cache of a virtual machine, based on the solutions provided in the embodiments of this application, a physical machine can directly access the cache of the virtual machine without virtualization overheads. In addition, the physical machine may further perform, through cooperation among a front-end driver, a back-end driver, and a cache management module, unified cache management such as cache allocation, cache flushing, cache eviction, cache size modification, cache property modification, and cache reuse on N virtual machines on the physical machine. This implements flexible management of the caches of the virtual machines and reduces cache management costs.

The other approaches further provides a virtual cache solution. To be specific, a storage medium (or referred to as a storage device) on a high-performance Peripheral Component Interconnect (PCI) interface is passed through to a virtual machine and used as a cache, or a memory of a virtual machine is directly used as a cache. In this solution, access in the virtual machine to the pass-through storage medium does not require participation of virtualization software, and the virtual machine can directly access the storage medium like a physical machine. Therefore, the physical machine can directly access the cache of the virtual machine without virtualization overheads. However, in this solution, because each virtual machine manages its own cache, virtual machines cannot share a cache, and the cache cannot be dynamically scaled up or down. Therefore, the physical machine cannot manage all caches of the virtual machines, flexible management cannot be implemented, and costs cannot be reduced. In addition, in the solution in which the memory of the virtual machine is directly used as the cache of the virtual machine, the physical machine can manage all memories of virtual machines. However, because the cache and the memory of the virtual machine belong to different management layers, the physical machine cannot implement unified management of caches of the virtual machines.

The foregoing mainly describes the solutions provided in the embodiments of this application from a perspective of interaction between network elements. It may be understood that, to implement the foregoing functions, each network element, for example, a server or a terminal, includes a corresponding hardware structure and/or software module for performing each function. A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the server or the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that division into the modules in the embodiments of this application is an example, is merely logical function division, and may be other division in actual implementation.

Figure 13:
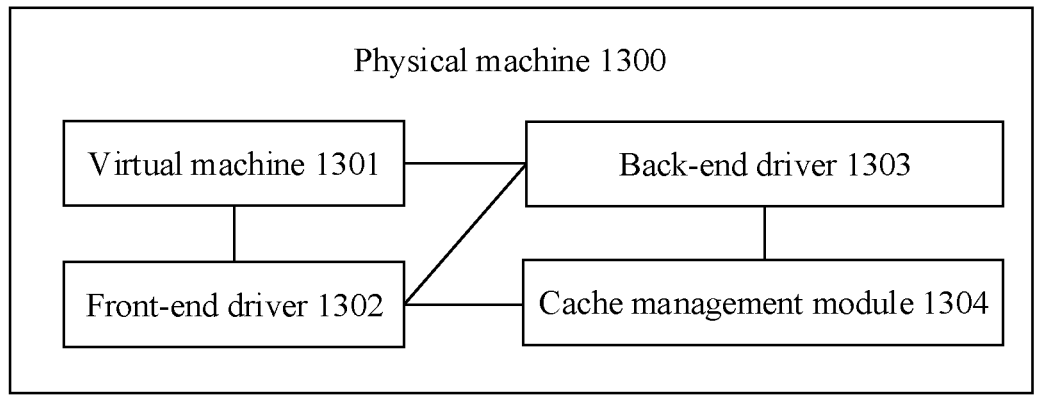
FIG. 13 is a schematic diagram of a structure of a physical machine according to an embodiment of this application.

When each functional module is obtained through division based on each corresponding function, FIG. 13 is a possible schematic composition diagram of a physical machine 1300 related to the foregoing embodiments. As shown in FIG. 13, the physical machine 1300 may include a virtual machine 1301, a front-end driver 1302, a back-end driver 1303, and a cache management module 1304.

The virtual machine 1301 is configured to send an operation request to the front-end driver 1302, where the operation request includes a first virtual address, and is used to request to read or write data from or to a location that is in a virtual disk and that is indicated by the first virtual address.

The front-end driver 1302 may be configured to support the physical machine 1300 in performing steps 401 and 402, step 403, step 405, steps 601 to 603, step 606, steps 701 to 703, step 802, step 903, step 1003, step 1101, step 1102, step 1104, step 1204, and/or another process of the technology described in this specification.

The back-end driver 1303 may be configured to support the physical machine 1300 in performing step 801, and may be further configured to initiate a cache size modification or a cache property modification, and/or perform another process of the technology described in this specification.

The cache management module 1304 may be configured to support the physical machine 1300 in performing step 404, steps 406 and 407, steps 604 and 605, steps 704 and 705, step 803, steps 901 and 902, steps 1001 and 1002, step 1103, step 1105, step 1106, step 1107, steps 1201 to 1203, and/or another process of the technology described in this specification.

It should be noted that all related content of the steps in the foregoing method embodiments may be cited in function descriptions of corresponding functional modules. Details are not described herein.

A physical machine provided in an embodiment of this application is configured to perform the foregoing virtualized cache implementation method, and therefore can achieve a same effect as the foregoing virtualized cache implementation method.

When each functional module is obtained through division based on each corresponding function, the physical machine may include an obtaining module, a processing module, a read/write module, and a cache management module.

The obtaining module is configured to perform step 401, step 601, step 701, and/or another process of the technology described in this specification.

The processing module is configured to perform step 402, step 405, step 602, step 603, step 606, step 702, step 703, step 706, step 802, step 903, step 1003, and/or another process of the technology described in this specification.

The read/write module is configured to perform step 403 and/or another process of the technology described in this specification.

The obtaining module, the processing module, and the read/write module may be further implemented by the front-end driver 1302.

When an integrated unit is used, the physical machine may include a processing module and a storage module. The processing module is configured to control and manage actions of the physical machine. For example, the processing module may be configured to support the physical machine 1300 in performing the steps performed by the front-end driver 1302, the back-end driver 1303, and the cache management module 1304, and/or another process of the technology described in this specification. The storage module is configured to support the physical machine 1300 in caching and storing program code and data.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor (DSP) and a microprocessor. The storage module may be a memory.

In a simple embodiment, when the processing module is a processor and the storage module is a memory, the physical machine in this embodiment of this application may be a device having the computer system 300 shown in FIG. 3.

An embodiment of this application further provides a computer storage medium. The computer storage medium stores a computer instruction. When the computer instruction is run on a physical machine, the physical machine is enabled to perform the foregoing related method steps to implement the virtualized cache implementation method in the foregoing embodiments.

An embodiment of this application further provides a computer program product. When the computer program product runs on a computer, the computer is enabled to perform the foregoing related steps to implement the virtualized cache implementation method in the foregoing embodiments.

In addition, an embodiment of this application further provides an apparatus. The apparatus may be a chip, a component, or a module. The apparatus may include a processor and a memory that are connected. The memory is configured to store a computer-executable instruction. When the apparatus runs, the processor may execute the computer-executable instruction stored in the memory, to enable the chip to perform the virtualized cache implementation method in the foregoing method embodiments.

The physical machine, the computer storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division into the foregoing functional modules is merely used as an example for illustration. In actual application, the foregoing functions may be allocated to and implemented by different functional modules according to a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the other approaches, or all or some of the technical solutions may be implemented in a form of a software product. The software product is stored in a storage medium and includes instructions for instructing a device (which may be a single-chip microcomputer, a chip, or the like) or a processor to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A virtualized cache implementation method implemented by a physical machine, wherein the virtualized cache implementation method comprises:
    storing, by a memory of a virtual machine running on the physical machine, cache metadata comprising a one-to-one mapping relationship between virtual addresses and first physical addresses, wherein each of the virtual addresses indicates a corresponding location in a virtual disk, wherein each of the first physical addresses is a physical address of a cache in the virtual machine;
    obtaining an operation request from the virtual machine, wherein the operation request comprises a first virtual address indicating a first location in a virtual disk and requests to read first data from or write the first data to the first location in the virtual disk;
    determining, based on preconfigured mapping relationships between the first physical addresses and second physical addresses, a target second physical address corresponding to a target first physical address that corresponds to the first virtual address when the cache metadata in a memory of the virtual machine comprises the target first physical address, wherein each of the second physical addresses is of a physical disk in the physical machine; and
    reading the first data from or writing the first data to a second location in a target physical disk indicated by the target second physical address.

2. The virtualized cache implementation method of claim 1, wherein when the cache metadata does not comprise the target first physical address, the method further comprises:
    writing the first data into a third location of the cache, wherein the third location is represented as the target first physical address;
    determining, based on the preconfigured mapping relationships, the target second physical address; and
    storing a first mapping relationship between the target first physical address and the first virtual address into the cache metadata.

3. The virtualized cache implementation method of claim 1, further comprising:
    allocating a part of third physical addresses in the physical disk to the cache; and
    establishing the preconfigured mapping relationships using the part of third physical addresses.

4. The virtualized cache implementation method of claim 3, further comprising:
    modifying a range of each of the part of the third physical addresses to obtain a modified range; and
    updating the preconfigured mapping relationships based on the modified range.

5. The virtualized cache implementation method of claim 1, further comprising:
    running N virtual machines on the physical machine, wherein N is a positive integer;
    determining second data from caches of the N virtual machines;
    deleting the second data from the caches; and
    deleting a second mapping relationship, in the cache metadata, between a first physical address corresponding to the second data and a virtual address corresponding to the second data.

6. The virtualized cache implementation method of claim 5, further comprising determining the second data based on first quality of service (QoS) parameters of the N virtual machines or second QoS parameters of virtual disks in the N virtual machines, wherein each of the first QoS parameters and the second QoS parameters comprises at least one of a reserved value of the cache, an upper limit of the cache, or a priority of the cache.

7. The virtualized cache implementation method of claim 1, further comprising:
    running N virtual machines on the physical machine, wherein N is a positive integer, wherein the cache metadata further comprises a cache status indicating whether fourth data in each of caches of the N virtual machine is flushed to the physical disk;
    determining the fourth data from the caches;
    flushing the fourth data to the physical disk; and
    updating the cache status.

8. The virtualized cache implementation method of claim 7, further comprising determining the fourth data based on first quality of service (QoS) parameters of the N virtual machines or second QoS parameters of virtual disks in the N virtual machines, wherein each of the QoS parameters and the second QoS parameters comprises at least one of a reserved value of the cache, an upper limit of the cache, or a priority of the cache.

9. A physical machine comprising:
    a virtual machine comprising:
        a cache;
        a virtual disk; and
        a memory configured to store cache metadata comprising a one-to-one mapping relationship between virtual addresses and first physical addresses, wherein each of the virtual addresses indicates a corresponding location in a virtual disk, and wherein each of the first physical addresses is a physical address of the cache,
    wherein the virtual machine is configured to send an operation request, wherein the operation request comprises a first virtual address indicating a first location in a virtual disk and requests to read first data from or write the first data to the first location in the virtual disk that is indicated by the first virtual address;
    a physical disk; and
    a front-end driver coupled to the physical disk and configured to:
        obtain the operation request from the virtual machine;
        determine, based on preconfigured mapping relationships between the first physical addresses and second physical addresses, a target second physical address corresponding to a target first physical address that corresponds to the first virtual address when the cache metadata comprises the target first physical address, wherein each of the second physical addresses is of the physical disk; and read the first data from or write the first data to a second location in the physical disk indicated by the target second physical address.

10. The physical machine of claim 9, further comprising a cache management apparatus coupled to the virtual machine and configured to:

write the first data into a third location of the cache, wherein the third location is represented as the target first physical address;

determine, based on the preconfigured mapping relationships, the target second physical address; and store a first mapping relationship between the target first physical address and the first virtual address into the cache metadata.

11. A physical machine comprising:

a non-transitory computer storage medium configured to store a computer program; and a processor coupled to the non-transitory computer storage medium and configured to execute the computer program to cause the physical machine to be configured to:

obtain an operation request from a virtual machine running on the physical machine, wherein a memory of the virtual machine stores cache metadata comprising a one-to-one mapping relationship between virtual addresses and first physical addresses, wherein each of the virtual addresses indicates a corresponding location in a virtual disk, wherein each of the first physical addresses is of a cache in the virtual machine, wherein the operation request comprises a first virtual address indicating a first location in a virtual disk and requests to read first data from or write the first data to the first location in the virtual disk;

determine, based on preconfigured mapping relationships between the first physical addresses and second physical addresses, a target second physical address corresponding to a target first physical address that corresponds to the first virtual address when the cache metadata comprises the target first physical address, wherein each of the second physical addresses is of a physical disk in the physical machine; and read the first data from or write the first data to a second location in the physical disk that is indicated by the target second physical address.

12. The physical machine of claim 11, wherein when the cache metadata does not comprise the target first physical address, the computer program further causes the physical machine to be configured to:

write the first data into a third location of the cache, wherein the third location is represented as the target first physical address;

determine, based on the preconfigured mapping relationship, the target second physical address; and store a first mapping relationship between the target first physical address and the first virtual address into the cache metadata.

13. The physical machine of claim 11, wherein the computer program further causes the physical machine to be configured to:

allocate a part of third physical addresses in the physical disk to the cache; and establish the preconfigured mapping relationships using the part of the third physical addresses.

14. The physical machine of claim 13, wherein the computer program further causes the physical machine to be configured to:

modify a range of each of the physical addresses to obtain a modified range; and update the preconfigured mapping relationships based on the modified range.

15. The physical machine of claim 11, wherein N virtual machines run on the physical machine, wherein N is a positive integer, and wherein the computer program further causes the physical machine to be configured to:

determine second data from caches of the N virtual machines;

delete the second data from the caches; and delete a mapping relationship, in the cache metadata, between a first physical address corresponding to the second data and a virtual address corresponding to the second data.

16. The physical machine of claim 15, wherein the computer program further causes the physical machine to be configured to determine the second data based on first quality of service (QoS) parameters of the N virtual machines or second QoS parameters of virtual disks in the N virtual machines, wherein each of the first QoS parameters and the second QoS parameters comprises at least one of a reserved value of the cache, an upper limit of the cache, or a priority of the cache.

17. The physical machine of claim 11, wherein N virtual machines run on the physical machine, wherein N is a positive integer, wherein the cache metadata further comprises a cache status indicating whether fourth data in each of caches is flushed to the physical disk, and wherein the computer program further causes the physical machine to be configured to:

determine the fourth data from the caches;

flush the fourth data to the physical disk; and update the cache status.

18. The physical machine of claim 17, wherein the computer program further causes the physical machine to be configured to determine the fourth data based on first quality of service (QoS) parameters of the N virtual machines or second QoS parameters of virtual disks in the N virtual machines, and wherein each of the first QoS parameters and the second QoS parameters comprises at least one of a reserved value of the cache, an upper limit of the cache, or a priority of the cache.

19. A computer program product comprising computer-executable instructions for storage on a non-transitory computer storage medium that, when executed by a processor, cause a physical machine to:

obtain an operation request from a virtual machine running on the physical machine, wherein a memory of the virtual machine stores cache metadata comprising a one-to-one mapping relationship between virtual addresses and first physical addresses, wherein each of the virtual addresses indicates a corresponding location in a virtual disk, wherein each of the first physical addresses is a physical address of a cache in the virtual machine, wherein the operation request comprises a first virtual address indicating a first location in a virtual disk, and wherein the operation request requests to read first data from or write the first data to the first location in the virtual disk;

determine, based on preconfigured mapping relationships between the first physical addresses and second physical addresses, a target second physical address corresponding to a target first physical address that corresponds to the first virtual address when the cache metadata comprises the target first physical address, wherein each of the second physical addresses is of a physical disk in the physical machine; and read the first data from or write the first data to a second location in the physical disk that is indicated by the target second physical address.

20. The computer program product of claim 19, wherein when the cache metadata does not comprise the target first physical address, the computer-executable instructions further cause the physical machine to:

write the first data into a third location of the cache, wherein the third location is represented as the target first physical address;

determine, based on the preconfigured mapping relationship, the target second physical address; and store a first mapping relationship between the target first physical address and the first virtual address into the cache metadata.

* * * * *